United States Patent [19]

Dragne et al.

[11] Patent Number: 5,969,340
[45] Date of Patent: Oct. 19, 1999

[54] SEED COUNTING APPARATUS FOR A PLANTER MONITOR

[75] Inventors: Rasvan N. Dragne; James F. White; Nikolai Tevs, all of Winnipeg, Canada

[73] Assignee: Vansco Electronics Ltd., Manitoba, Canada

[21] Appl. No.: 08/907,495

[22] Filed: Aug. 8, 1997

Related U.S. Application Data

[63] Continuation-in-part of application No. 08/532,524, Sep. 22, 1995, Pat. No. 5,883,383.
[51] Int. Cl.$^6$ ...................................................... H01J 40/14
[52] U.S. Cl. ..................................... 250/223 R; 250/222.1
[58] Field of Search .............................. 250/223 R, 222.1, 250/222.2, 205, 214 R; 364/555, 569; 377/10, 53

[56] References Cited

U.S. PATENT DOCUMENTS

| | | |
|---|---|---|
| 3,723,989 | 3/1973 | Fathauer et al. . |
| 4,166,948 | 9/1979 | Steffen . |
| 4,307,390 | 12/1981 | Steffen et al. . |
| 4,555,624 | 11/1985 | Steffen . |
| 4,634,855 | 1/1987 | Friend et al. . |
| 4,635,215 | 1/1987 | Friend . |

*Primary Examiner*—Edward P. Westin
*Assistant Examiner*—Kevin Pyo
*Attorney, Agent, or Firm*—Adrian D. Battison; Murray E. Thrift

[57] ABSTRACT

A seed counter for counting seeds flowing through a duct includes a light transmitter on one side of the duct and light receiver on the opposed side of the duct together with an electronic circuit effecting analysis of the signals received by the receiver to generate a seed count value which represents accurately as possible the number of seeds passing through the duct. The transmitter and receiver each comprise a channel-shaped body with diodes at a base of the channel with the channel filled with a translucent potting material facing into the duct. The circuit receives the signals which include for each passage of a seed or a clump of seeds a temporary reduction in light intensity which is converted to a reduction in voltage. Prior to start up the steady state voltage is measured and the current to the transmitter varied to provide a predetermined level of signal at the receiver. The circuit includes a DC compression circuit and a AC compression circuit at an amplifier so as to provide an output signal in a required amplitude range. An autobiasing section maintains a steady state signal at a required level. The amplitude of the signal is compared to a threshold by generating a first signal which is offset by the threshold and a second signal which is delayed by a predetermined time period, the comparison generating a square wave output when one of the signals crosses the other signal. The seed counter is used in a monitoring system having a central monitor which can be operated to vary the parameters of the comparison circuit including the time delay. The use of the comparison circuit assists in determining the difference between a single seed and a clump of seeds passing the transmitter/receiver simultaneously.

21 Claims, 15 Drawing Sheets

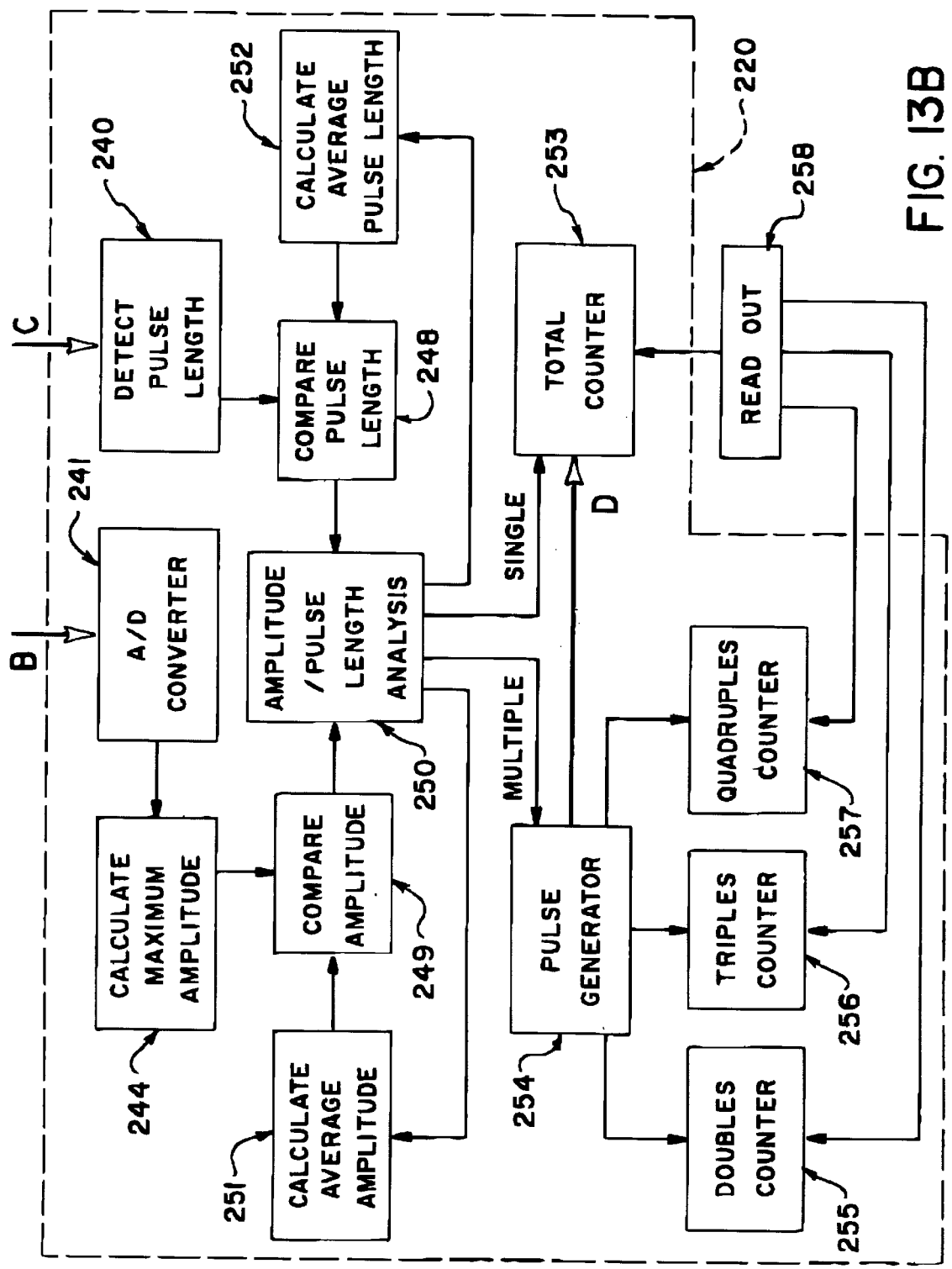

SEED COUNTING APPARATUS FOR A PLANTER MONITOR

This application is a continuation-in-part of application Ser. No. 08/532,524, filed Sep. 22, 1995 and now issued as U.S. Pat. No. 5,883,383 on Mar. 16, 1999.

This invention relates to a seed counting apparatus for use in a planter monitor for generating a seed count value in response to a series of seeds moving through a seed transport duct of the planter.

BACKGROUND OF THE INVENTION

While various techniques have been explored for detecting seeds falling in a tube, the most commonly used technique is that of a light source and photo sensor which detect the passage of seeds by counting pulses generated by the momentary reduction in light intensity from the steady state intensity caused by the passage of a seed between the light source and the sensor.

The vast majority of products of this type actually manufactured and sold in the marketplace have been manufactured by Dickey-John Corporation and they have obtained issue of a number of patents in this field. In particular the following patents of Dickey-John have some relevance in this field.

U.S. Pat. No. 3,723,989 (Fathauer) discloses an arrangement in which the intensity of the light source is varied to accommodate changes in reception by the sensor due to dirt or dust collecting between the light source and the sensor.

U.S. Pat. No. 4,555,624 (Steffen) discloses a technique for analyzing the pulses generated by the momentary change in intensity value by following the changes in direction in the pulse and by generating individual positive and negative square-wave pulses in response to each change in direction.

U.S. Pat. No. 4,307,390 (Steffen) discloses an arrangement including a plurality of light sensitive sensors and an arrangement in which the number of counts or pulses recorded is increased relative to the number of input signals in dependence upon which one or ones of the plurality of light sensitive sensors are activated and in dependence upon the rate at which the signals are produced.

U.S. Pat. No. 4,166,948 (Steffen) discloses an arrangement in which the amplitude of the pulses is maintained above a predetermined minimum value by the sensor circuit, despite reductions in light intensity due to the accumulation of dirt and dust.

U.S. Pat. No. 4,635,215 (Friend assigned to Deere & Company and issued Jan. 6, 1987) provides a yet further technique which has not achieved any commercial success. U.S. Pat. No. 4,634,855 of the same inventor is filed on the same date issued on the same date and includes exactly the same disclosure. These patents utilize a technique in which the signal is amplified by an operational amplifier and then is analyzed using an analog to digital technique in which the area under each pulse is detected by integrating the sequential digital signals. This area is then compared with the area generated by other pulses to determine those which are representative of more than one seed.

As set out in the above patents, one problem which arises in relation to seed counters of this type is that it is necessary to include in the count those seeds which pass the sensor simultaneously or partly overlapping or otherwise simply counting a number of pulses would significantly undercount the number of seeds actually passing. This correction factor varies in dependence upon the type of seeds involved in the counting including the size of the seeds, the rate of passage of the seeds, and the geometrical shape of the seeds, since some seed shapes tend to produce a dipped pulse similar to an appearance to overlapping pulses from two seeds.

A further problem relates to the accumulation of dust and dirt which can vary the intensity of light normally received by the sensor.

A yet further problem relates to the geometry of the light source and the sensor which can either leave areas of the duct which are not properly monitored or can generate spurious reflections thus distorting the pulses. This invention relates to a method for communication between components of a machine which can be used for monitoring operation of a machine and/or for actuating or controlling various aspects of the machine. The invention is particularly but not exclusively designed for use with agricultural machines such as seeders, planters and the like.

Devices for monitoring seeders, planters and the like have previously been proposed, and generally these include sensors or transducers at various locations on the device for detecting various parameters of the operation of the machine. Thus one well known requirement for a sensor is that of detecting seed flow or seed movement. In an air seeder it is often desirable to detect the flow of seeds in an air tube to provide an indication of the rate of flow which can be also used to detect a blockage or zero flow. Further sensors have been provided for detecting the rate of rotation of shafts of the machine either for detecting seed supply rate or for detecting other parameters such as ground speed as detected by rotation of an axle. Yet further sensors have been provided for detecting a level of filling of a supply tank.

Generally the detection apparatus includes a central control unit with a key pad for allowing manual data entry, a display for providing information to the operator and a communication system for communication between the central control unit and the individual sensors. Generally devices of this type have used sensors which are simply switches or transducers which therefore provide a simple detection of a parameter to be detected and transmit a signal to the central control unit on detection of the parameter. Thus the conventional sensor does not include any memory or logic control so that the information is not acted upon or stored at the sensor itself. Such sensors require direct communication from the sensor itself to the control unit thus requiring individual wiring from each sensor to the control unit.

As the monitoring devices of this type become more complex and require more parameters to be monitored, the complexity of such individual wiring arrangements significantly increases cost and installation complication.

In addition to the monitoring function the present invention can also be used in relation to combined monitoring and control functions and also in relation to communication protocols between elements of a control system which does not include any monitoring function.

SUMMARY OF THE INVENTION

It is one object of the present invention to provide an improved sensor for counting seeds in a planter monitor.

One embodiment of the invention will now be described in conjunction with the accompanying drawings in which:

BRIEF DESCRIPTION OF THE DRAWINGS

FIGS. 13A and 13B together form is a schematic illustration of a circuit second sensor circuit according to the present invention including a light sensor and circuit elements for analyzing the pulse output from the light sensor.

In the drawings like characters of reference indicate corresponding parts in the different figures.

DETAILED DESCRIPTION

The following description relates to a monitoring system but the present invention can also be used in a combined monitoring and actuating or control system or in a system which relates solely to communication from a central control unit to a plurality of slave control units.

Figure 1:
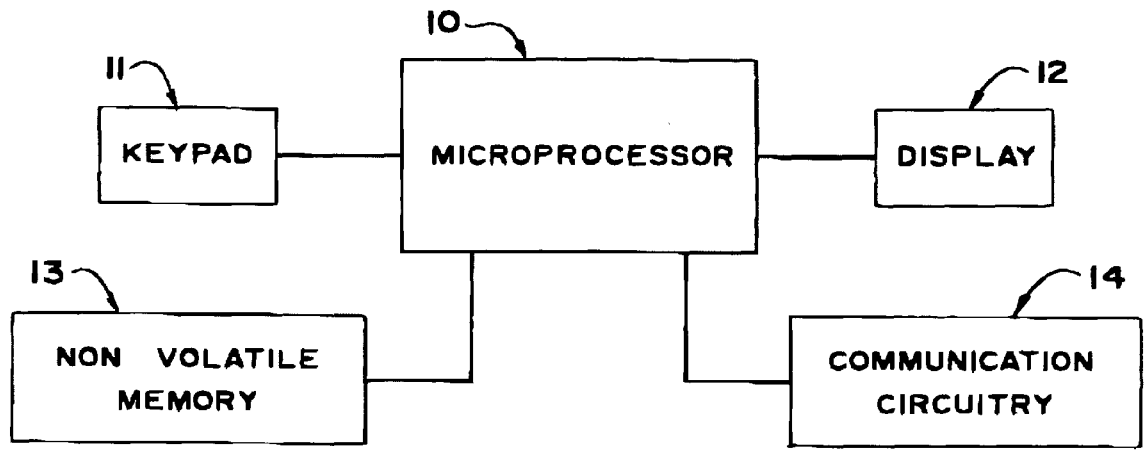
FIG. 1 is a block diagram showing the construction of the central monitor unit.

The construction of the central monitor unit is shown schematically in FIG. 1 and comprises a monitor microprocessor 10 which has connected thereto a manual input keypad 11, a display 12, a memory unit 13. The microprocessor also is connected to a communication interface 14 which is attached to the communication bus for connection to each of the sensors.

Figure 3:
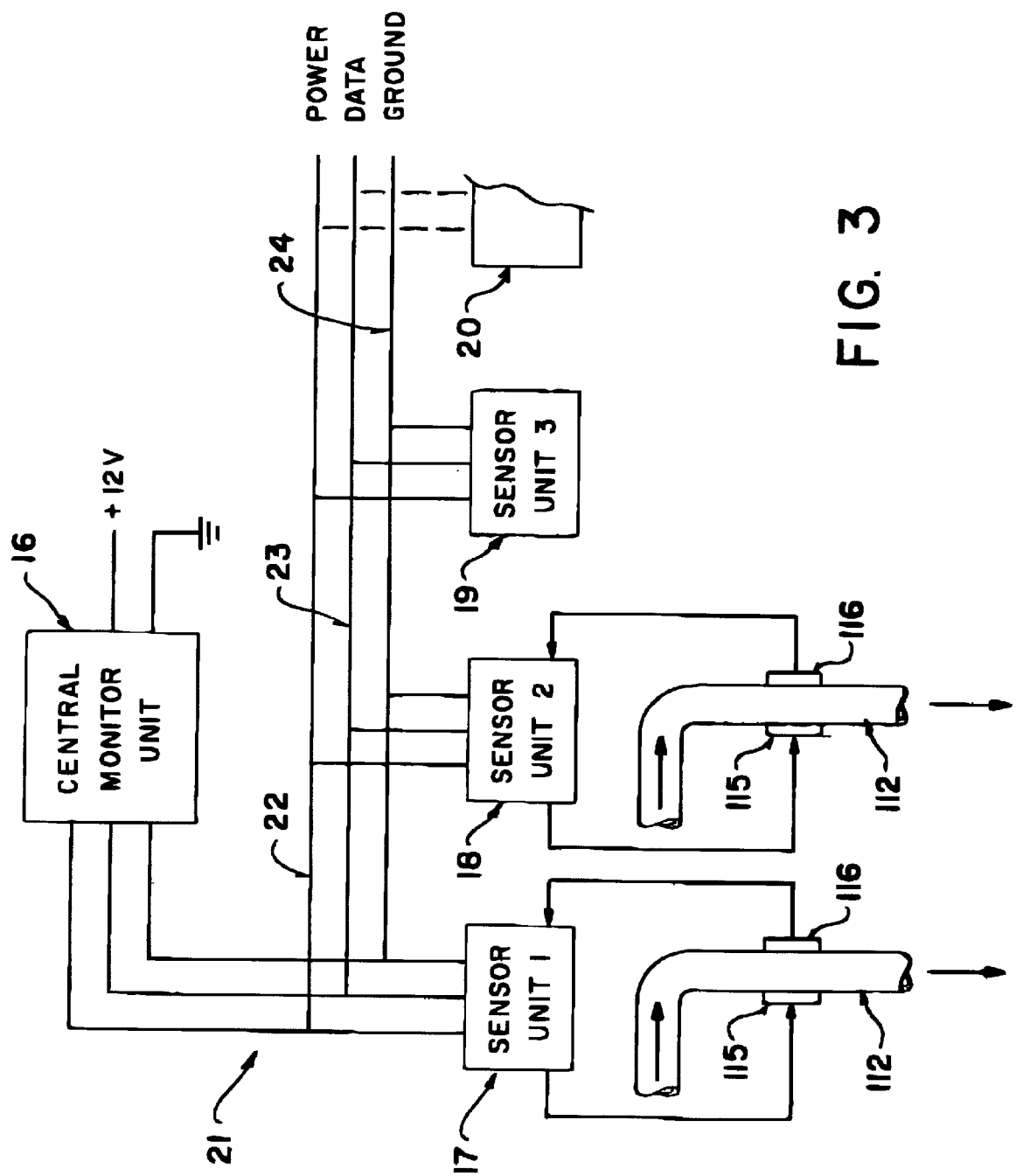
FIG. 3 is a block diagram of the whole system including the central monitor unit and the plurality of individual sensors.

Thus as shown in FIG. 3, the central monitor is generally indicated at 16 and is connected to each of the sensors individually indicated at 17, 18, 19, 20 etc. through a simple communication bus generally indicated at 21 which connects to each sensor in parallel. Thus the communication bus consists solely of three wires comprising a power wire 22, a data communication wire 23 and a ground return 24. As the sensors are each connected to the communication bus in parallel, it is necessary to provide a communication protocol between the monitor and each of the sensors to avoid the sensors communicating on the communication bus simultaneously.

Figure 2:
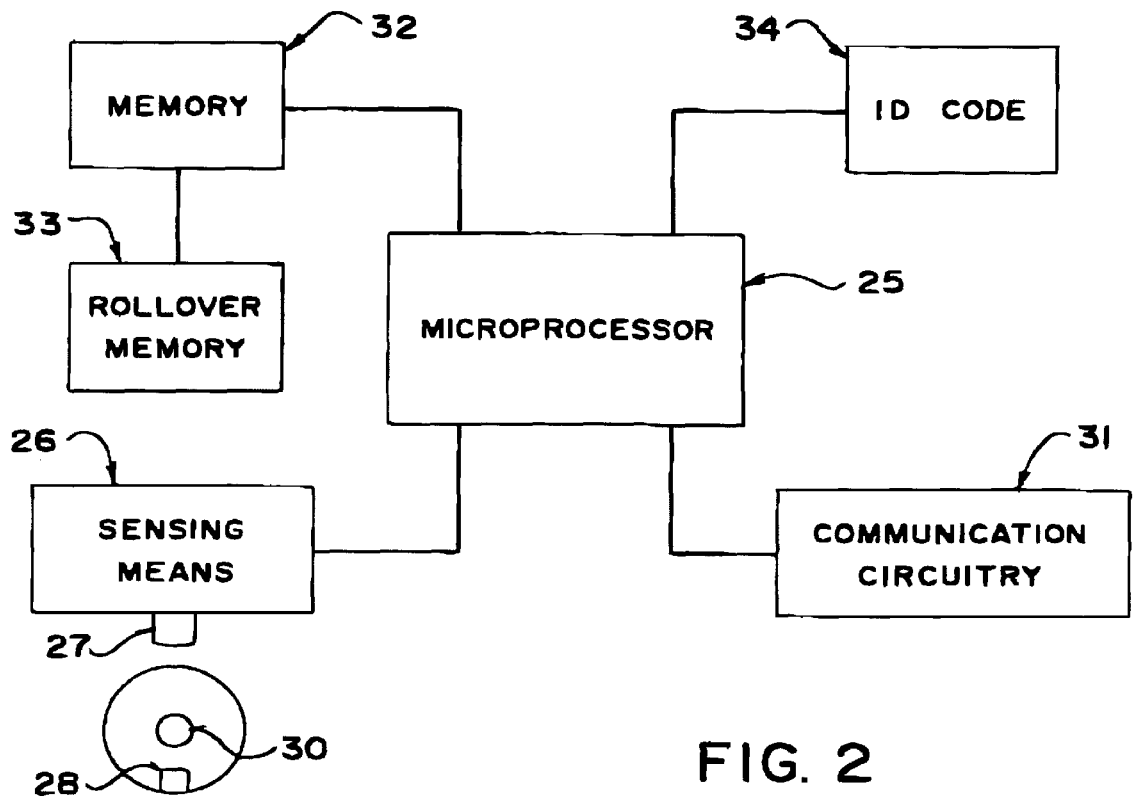
FIG. 2 is a block diagram showing the construction of each individual sensor element illustrating for example a sensor for detecting rotation of a shaft.

The construction of one sensor is shown in FIG. 2 and as one example the sensor for detecting rotation of a shaft is shown although of course other types of sensors are necessary as will be well known to one skilled in the art.

Thus the sensor comprises a sensor microprocessor 25 which connects to a sensing means or transducer 26 for detecting an event. In the example shown, the sensing means 26 carries a switch for detecting passage by the switch of a switch element 28 carried on a shaft 30. In one example the switch 27 can comprise a reed switch so that the switch element 28 comprises a magnet which actuates the reed switch each time the magnet passes by the reed switch 27. As an alternative, the switch 27 can comprise a variable reluctance sensor which monitors the output from a variable reluctance pickup determining the passage thereby of a piece of ferrous material constituting the element 28.

As previously explained, the shaft 30 can comprise one of many different shafts on a machine sensing engine speed or ground speed or other rates of rotation of a shaft for effecting various functions.

The sensor further includes a communication interface 31 connected to the microprocessor 25 with the interface 31 connecting to the communication bus 21. The microprocessor 25 further includes access to information stored in a first memory 32 which includes as a subset of that memory a counter 33. The microprocessor further has access to a unique ID code stored in a memory element 34. The memory element 34 is of a type which allows a unique ID code to be embedded in the sensor during manufacture. The manufacturing process can therefore ensure that each sensor has a unique code different from the code embedded in any other sensors manufactured so that there is no practical possibility of an overlap between the codes of the sensors.

The ID code is inserted in the one-time programmable memory at the time the microprocessor is initially programmed. The programmer is set up in such a way as to put into each sensor in turn at a certain memory location in that sensor a number which is increasing for each subsequent sensor manufactured. The ID number consists of a sixteen bit serial number and a four bit type code that is hard wired to the microprocessor. Procedures in production ensure that sensors will not be programmed with the same code. Naturally, when all the ID codes for a given sensor type have been used, the codes will be repeated. However it is very unlikely that two sensors with the same code will be used on a particular machine so that problems from duplication will be avoided. The communication protocol between the central monitor unit and the sensors is as follows:

1.0 Overview

This protocol is intended to connect one master (the MONITOR) and up to 250 slaves (SENSORS or ACTUATORS) on a half duplex link. In the real world, the number of attached slaves is limited by the hardware implementation to 40. The communication is done using a standard SCI port working at 2400 bd, 1 stop bit, 8 data bits, lsb first. Values greater than 255 will be send LSB first.

All slaves shall have an unique 16 bit serial number pre-programmed in rom and an 8 bit number to define its TYPE. The TYPE number is used to define 256 partitions or slave types. These 2 numbers are available on request. The serial number and the TYPE number are used to define an equivalent address space of 2**24 known as slave's PHYSICAL ADDRESS.

To speed-up the communication, the usage of the Physical Address is limited to only a few, seldom used frames as qualifying data. To replace it, the monitor will allocate each sensor in the present configuration an unique 1 byte number known as LOGICAL ADDRESS. This process will take place on each power-up and then, as often as necessary.

The monitor will have to learn new slaves, name them, and detect and rename malfunctioning slaves.

The 1 byte LOGICAL ADDRESS defines an addressing space from 0 to 255. Addresses from 1 to 250 will specify one slave only. Address 0 shall be the DEFAULT_ADDRESS (assumed by the slaves on "power-up" or "ram_ corrupted" conditions). The codes from 251 to 255 are invalid addresses and they are used as special formatting codes.

The link is based on FRAMES, each frame being started by the master with a COMMAND MESSAGE.

A Command Message may be GLOBAL, and will target all sensors, or DIRECT-ed to a sensor only. The Default_Address is used to define a global command. In general, it is not possible to get the slave(s) to ACKnowledge on a global command and is recommended to send the same frame several times to improve reliability.

Using the Default_Address the monitor will:

see new, just attached slaves during installation time (only ONE new slave of the same type can be connected at any time)

allocate a logical address to each known slave after power-up, in which case the address 0 will be further qualified by the unique 16 bit serial number and 8 bit TYPE number, both "programmed" in each slave's rom during mfg.

broadcast global commands which will instruct all the slaves to execute same specified action.

The FRAME_END depends on the type of command message issued. In general, the sensor will send back some data bytes and/or a checksum to OK the transaction. There will be no reply if the addressed slave is not in the current configuration, or the Command_Message is not verified by its checksum(s) at slave's end, or the Command_Message tells the slave a reply is not expected. If the sensor's reply is expected, but not seen, the monitor will retry a few times before flagging the error to the user.

2.0 Frame Format

<SYNC><Command_Message><Slave_Reply>

All frames shall start with an unique SYNC character ($ff). To allow the transmission of the $ff data byte, will be translated to ($ff|$fe, where $fe is the Translate_code). That means the receiver will see the SYNC byte as "frame start" or "valid $ff if SYNC received already.

NOTE: The SYNC code will also keep the sensor from resetting. As long a SYNC code is regularly received at intervals shorter then 1 second, the sensors will clear their sanity timer. If SYNC is delayed for a longer time, the sensors will reset and will set all the parameters to their default values. One important consequence will be the sensor "name" will change to the DEFAULT_ADDRESS, and thus the sensor will only respond to global frames and must be re-initialized.

2.1 Command_Message

The Command_Message format is:

<ADDRESS><COMMAND><OFFSET><SIZE><checksum1><FUNCTION>DATA><checksum2> where <FUNCTION><DATA><checksum2> fields are optional.

The ADDRESS (8 bits) is the slave's name (or its allocated logical address). If the Command_Message is global it will use the Default_Address (0). When a global frame is broadcasted all slaves shall load the command and execute it.

If the received ADDRESS is in the range from 1 to 250 the slave will check it against its name and if different, will ignore the remainder of the frame. If there is a match between the received address and slave's name, the slave will continue loading the frame. As mentioned above the codes from 251 to 255 are reserved and cannot be used as address identifiers.

A small block of memory is reserved in each slave to define the COMMON block, which is available to the rest of the network. This approach will limit the interference between the network commands and the private memory on each slave. The length of the Common block may be different on different types of sensors.

The COMMAND field (1 bit) sets the frame type. There are 2 frame types available:

GET=1, asks the slave to send back some data from its COMMON memory.

PUT=0, asks the slave to write a small data block into its COMMON memory.

The OFFSET value (7 bits) is an index in the slave's Common table and SIZE (8 bits) is the number of bytes from that index to be up/downloaded. The FUNCTION field is used by PUT frames to further describe the request. All 256 combinations are available.

2.2 How will a slave react to an incoming Command Message?

All the slaves will see the address field. This address has to be either the DEFAULT_ADDRESS (0) or to match slave's logical address to keep the slave on line. If the slave decides to continue to listen, it will load the command, the offset, the size and will compute the checksum. If a match is found the sensor will validate this part of the Command_Message. Depending on the type of command, the slave may decide to execute it or continue to receive the remainder (<FUNCTION><DATA><CHECKSUM2>), check it again and execute or discard it.

2.3 Slave_Reply

Is in the form:

<DATA><checksum> with <DATA> field being optional.

2.4 Conventions

<>=logic delimiter

'=bit delimiter

|=byte delimiter

[]=master to slave message delimiter ( )=slave to master message delimiter

{}=frame delimiter $=hex value b"=binary value

Adr=the name of the slave or Default_Address (0)

chk1=checksum is the ADD of all previous bytes not including SYNC or Translate chk2=checksum is the add.mod.8 of the Function and all Data bytes, not including Translate codes chk3=checksum is the add.mod.8 of all slave's reply, not including Translate codes SN#=slave's pre-programmed unique 16b Serial number (rom)

TYPe=slave's hard-wired type, see Appendix 3 for the TYPE definitions.

3.0 Frame Detailed Description

The two basic frames, GET and PUT are described here in greater detail, including the corresponding Slave_Reply message. Examples will be given with the structure of the entire frame.

3.1 PUT Frames

There are a few variations of the PUT frame, depending on the value of the Function byte:

WRITE=0

LEARN=1

WAKE-UP=2

The general format of a PUT frame is:

```
<- - - - - - - - - - - - - - - - - - - - - - - - - - - - - - - - - - - -MASTER- - - - - - - - - - - - - - - - - - - - - - - - - - - - - - - - - - - -> <- - - - - -
SLAVE - - - - - ->
{[| SYNC | Adr | 0,Offset | Size | chk1 | FUNCTION | <Data> | chk2 |]( <Data> | <chk3>)}
```

The slave will load Offset, Size and Size*bytes (Function+ Data), then execute. None of the PUT functions will be allowed to write outside the COMMON block.

3.1.0 WRITE

Function code=$00

Write (SIZE-1) <DATA> from Buffer+1 to Common starting at OFFSET. The slave may echo back chk3=0 as ACK in direct mode.

May be used as a global command, but in that case no form of ACK is possible. A special form of WRITE GLOBAL is used to reset all slaves to default (former Sleep function) by writing 0 to Logical_Address location.

3.1.2 WAKE-UP

Function code=$02

This frame will write the "name" (1 byte) to Logical_Address location. It is used to (re-)name the slave with a new address. There is no difference if the command is global or direct. The slave must first qualify by comparing the received serial number and TYPE number against its own pre-programmed numbers and on a match condition assume the new name.

```
<- - - - - - - - - - - - - - - - - - - - - - - - - - - - - -MASTER- - - - - - - - - - - - - - - - - - - - - - - - - - - - - -> <- SLAVE ->
                                                        Fnct
{[| SYNC | Adr | 0,Offset | Size | chk1 | $00 | <Data> | chk2 |] (| chk3 |)}
ex:
<- - - - - - - - - - - - - - - - - - - - - - - - -MASTER- - - - - - - - - - - - - - - - - - - - -> <- - - SLAVE - - ->
SYNC Adr C/O Size Chk1 Fnct Data Chk2
{[| $ff | $00 | $00 | $02 | $02 | $00 | $00 | $00 |]}
is a global Sleep (Logical_Address = Default_Address = 0).
```

Note: No write bellow Common_End, no roll-over allowed; echo chk3=0 when possible. Although the frame sends out SIZE*bytes, one is used to specify the FUNCTION. Only SIZE-1 data byte are available per frame.

3.1.1 LEARN

Function code=$01

Is like a WRITE with SIZE=1 (no Data to write). Is used to learn slave's serial number and TYPE number. When it's broadcasted as a global command all slaves which still have Logical_Address=0 (not named yet) will answer. It's very important to have only 1 new slave connected at any time. The master shall follow a Learn frame with a Wake-up frame and name the slave. As soon the master names the slave, the slave shall not answer to a global Learn any more.

```
<- - - - - - - - - - - - - - - - - - - - - - - - - - - MASTER - - - - - - - - - - - - - - - - - - - - - - - -> <- - - - - - - - - - - SLAVE - - - - - - - - - ->
                                                          Fnct
{[| SYNC | Adr | 0,Offset | Size | chk1 | $01 | chk2 |] (| TYPe | <SN#> | chk3 |)}
ex:
<- - - - - - - - - - - - - - - - - - - - - MASTER - - - - - - - - - - - - - - - - - -> <- - - - - - - - - - - - - - - SLAVE - - - - - - - - - - - - - - ->
SYNC Adr C/O Size Chkl Fnct Chk2 TYPe SN#LSB SN#MSB Chk3
{[| $ff | $00 | $00 | $01 | $01 | $01 | $01 |] (| $00 | $10 | $34 | $44 |)}
slave named $00 returns SN# = $3410, TYPe = $00.
```

Note: Offset n/u, set to 0; Size=1

```
<- - - - - - - - - - - - - - - - - - - - - - - - - - - - - - - - - - - -MASTER- - - - - - - - - - - - - - - - - - - - - - - - - - - - - - - - - - - -> <- -SLAVE- ->
                                                                            Fnct
{[| SYNC | Adr | 0,Offset | Size| chk1 | $02 | NuAdr | TYPe  | <SN# > | chk2 |] (| chk3 |)
ex:
<- - - - - - - - - - - - - - - - - - - - - - - - - - - - - MASTER - - - - - - - - - - - - - - - - - - - - - - - - - - - - - -> <- SLAVE ->
SYNC Adr C/O Size Chk1 Fnct NuAdr    Data        Chk2  Chk3
{[| $ff | $00 | $00 | $05 | $05 | $02 | $01 | $00 | $10 | $34 | $47 |] (| $00 |)}
slave serial number = $3410, TYPE = $00 is named $01. The slave will ACK by returning chk3 = 0.
```

Note: Offset=0 (LA), Size=5, chk3=0

3.2 GET frames

Read SIZE*DATA starting at OFFSET. There is only 1 GET frame available: direct GET. A global GET, using the Logic_Address=Default_Address will not be answered by the slaves and is not used. A directed GET will return a DATA field of SIZE bytes starting at base+OFFSET. There are no restrictions on GET frames, any block of ram may be read.

```
<- - - - - - - - - - - - - - - - - - - - MASTER - - - - - - - - - - - - - - - - - - - -> <- - - - - SLAVE - - - - ->
{[| SYNC | Adr | 1,Offset | Size | chk1 |] (<Data> | chk3 |)}
load OFFSET and SIZE then send back Size bytes from Common memory
starting at address Offset.
ex:
<- - - - - - - - - - - - - - - - - - MASTER - - - - - - - -> <- - - - - - - - - SLAVE - - - - - - - - - ->
SYNC Adr C/O Size Chk1                                    Measurement
{[| $ff | $01 | $81 | $03 | $85 |] (| LSB | xx | MSB | chk3 |)}
slave named $01 returns the last 3 bytes of data.
```

Various types of sensors can be used in the monitoring device of the present invention. In one example of sensor, the sensor can monitor rotation of a shaft. This can be effected using the conventional reed switch which opens and closes due to an external magnet mounted on the shaft and passing by the fixed switch located adjacent the shaft. As an alternative to the reed switch, a variable reluctance sensor can be provided comprising a variable reluctance pickup which determines when a piece of ferrous material passes by the pickup. Again the pickup is located adjacent a rotating body with the ferrous material mounted on the rotating body as a switch element.

The shaft sensor can be used to detect various shaft rotations including for example ground speed sensor which detects rotation of an axle or other suitable rotating position on a ground wheel.

In a sensor of this type, the sensing means 26 therefore effectively generates an electrical pulse indicative of actuation of the switch. The microprocessor 25 is programmed to detect the period of time between each actuation or pulse and the next actuation or pulse. The microprocessor therefore places into memory data relating to the period of time between the last two actuation's and the time since the last actuation. This data is therefore stored in the memory and is communicated to the central monitor on a polling request in the protocol explained herein above. The monitor therefore receives the data and places this data in its memory. The monitor operates on the data so as to use the time between the last two actuation's together with previously entered data concerning the number of actuation's per revolution to determine the rate of rotation of the shaft. The monitor uses the time since the last actuation to determine if the shaft has stopped. If this number becomes significantly larger than the time between the last two actuations, the monitor assumes the shaft has stopped. Also if the time period since the last actuation becomes larger than the time between the last two actuations, the monitor uses the time since the last actuation to calculate the shaft revolution rate. This allows the display to gradually change to the new rate and in the case of a completely stopped shaft, to gradually approach zero.

An alternative form of sensor comprises a seed counter sensor. The seed counter sensor uses an infrared light beam to detect the presence of a seed. When a seed is between the transmitter and the receiver, the light level is reduced and the sensor interprets this light reduction as the presence of a seed. There is a sensor located in each run of the seeder that is the discharge duct from the seed counting mechanism so as to count all of the seeds as they are discharged through the duct to the ground.

The seed counter sensor includes the rollover memory 33 so that each counted seed simply is monitored by the sensing means 26 to generate a pulse so that the pulse is then injected into the rollover memory which simply counts those pulses up to a predetermined maximum or rollover number.

When polled by the central monitor, the microprocessor of the respective sensor extracts the data from the rollover memory at the instant of polling and transmits that data to the central monitor unit. The act of extracting the information can either by used to zero the rollover memory so that each poll of the sensor produces data from the sensor relating to the number of pulses since the last poll. Alternatively the roller memory can continue to accumulate pulses so that it rolls over on reaching the maximum or roll over number.

Using either alternative techniques, the central monitor detects the number of pulses counted since the last polling. The central monitor is arranged to provide a variable polling rate of the order of a few seconds or less and this is tailored to the size of the rollover memory and the expected number of pulses per unit time to ensure that the sensor is polled before the rollover counter goes through a full cycle of counting. Even though the rollover counter may therefore rollover, the central monitor is aware that this has occurred and can calculate the total number of pulses since the last polling by the simple calculation necessary.

A further type of sensor comprises a material level sensor for detecting the amount of material in a supply container. One example of a material level sensor is of a type in which the sensing means comprises a device which generates an ultrasonic or light pulse and it detects the reflected signal and enters information concerning the signal into the memory.

On polling by the central monitor, the microprocessor 25 is arranged to communicate the data from the memory 32 with the central monitor effecting the calculation necessary to detect the distance of the material from the sensor and therefore the amount of material in the container.

Preferably, although not necessarily, the algorithms for effecting the calculations are stored in the memory 13 of the central monitor so that the majority of the calculation is effected by the central monitor. The individual sensors may therefore include only enough processing power to effect the necessary very simple actions to put the data from the sensor into the memory generally as a simple number or as a series of pulses which are counted in the rollover memory. The microprocessor 25 again simply has enough processing power to respond to the address signals from the central monitor as previously explained in order to extract the data from the memory and to transmit it when polled to the central monitor. The majority of the calculations therefore are effected in the central monitor with the central monitor holding the information necessary to effect the calculation of ground speed, seeds per unit time, material remaining, and the units in which the display should appear, for example inches or centimeters.

The central monitor also has the ability to calculate alarm conditions and to generate alarms when required to keep the operator properly informed.

The central monitor key pad can in one example have the ability to control the monitor to provide the following display functions.

Figure 4:
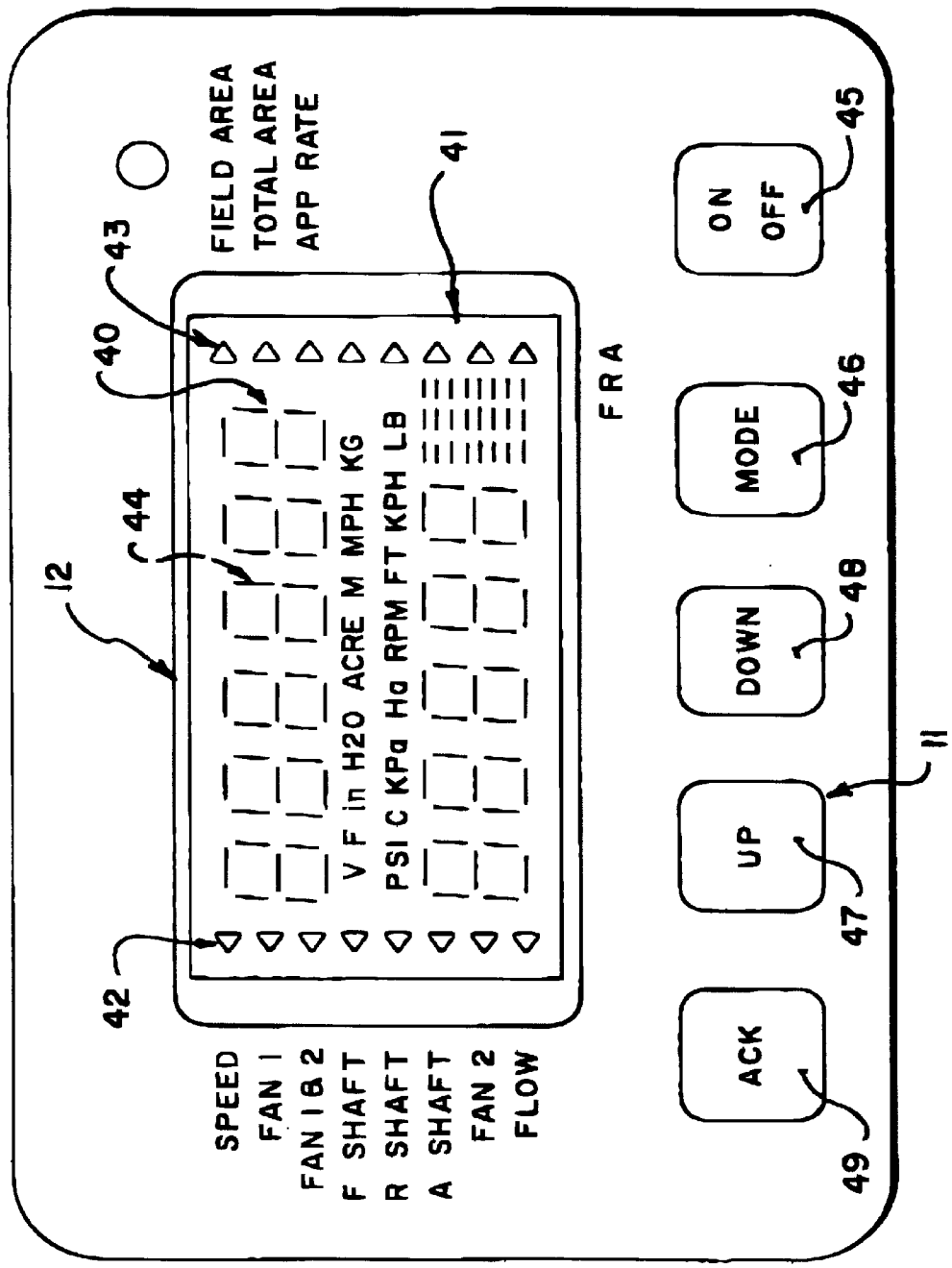
FIG. 4 is a front elevational view of the display and key pad of the central unit.

In FIG. 4 is shown a front elevational view of the display 12 and the key pad 11. The display 12 includes a first row 40 of alpha-numeric display digits and a second row 41 of numerical display digits capable of displaying words and numbers in the two separate rows. In addition the LCD display includes a number of pointers 42 indicative for example of speed, fan 1, fan 1 and 2, front shaft, rear shaft, auxiliary shaft, fan 2 and flow. A second set of pointers 43 are capable of indicating one of field area, total area and application rate. A central set of indicators 44 can indicate one of a number of different units of measure such as inches of water, acres, pounds per square inch, kilograms per hour etc.

The keypad 11 includes 5 keys including an on/off key 45, a mode select key 46, two keys 47 and 48 for scanning up and down and a fifth key 49 which acts as an acknowledge key to acknowledge a warning signal.

The mode select key can be used to select from a number of possible functions including the measurement units in which the measurements are to be displayed and also which of the elements indicated by the pointers 42 is to be selected. In addition the mode select key can be actuated to select the installation mode as described herein.

The sensor processors also are arranged to place into the sensor memory data received from the central monitor. Thus the individual sensor processors can be configured to effect different processing of the pulses or data from the sensing means.

In view of the fact that the central monitor and the individual sensors communicate on a single communication bus, it is of course necessary to configure and arrange the system so that the central monitor knows which sensor is which and can poll that sensor for the data from that sensor and at the same time is able to determine from which sensor the information is received.

The arrangement of the present invention therefore provides for each of the sensors a unique ID code as previously described which is stored in the memory system 34 as a permanent ID code assigned to and unique to that particular sensor.

In the initial installation of the system, therefore, the central monitor has an installation mode which may be actuated by a key sequence on the keypad. In the installation mode, the display indicates to the operator/installer that sensor which is to be installed first. The central monitor has therefore in the memory a program which defines the order in which the sensors are to be installed. This program therefore indicates in the display the first sensor to be installed by a simple alpha-numeric display on the LCD such as "F BIN" which would be indicative of the front bin level sensor.

The central monitor during this mode repeatedly issues a global command which will be recognized by all sensors which have not previously been polled. Thus the global command provides an instruction to each sensor to transmit data including or identifying the unique ID code of the sensor. Once the sensor has acted to transmit this information in response to the global command, that sensor then remains silent and does not respond to the global command.

During the installation procedure, therefore, the central monitor provides the instruction as to which sensor should be installed next and then receives information from that sensor after it is installed as to its ID code.

The installation procedure therefore does not allow the central monitor to issue a further instruction for installation of a second sensor until after the first sensor has been installed, and until after the sensor has been polled and retransmitted its ID code for recording in the memory of the central monitor.

The central monitor therefore can correlate in the memory thereof data concerning each individual sensor, its location and function together with the ID code of that sensor.

The installation procedure is therefore continued until all of the sensors are installed. It will be appreciated that the central monitor unit is designed for use with a number of different machines and configurations of machines and therefore the sensors used and the number of sensors will vary in dependence upon the particular machine onto which the unit is to be installed. In the installation mode, therefore, the central monitor unit is arranged to provide instruction to the operator to install sensors to the maximum number to which the monitor unit can accommodate for the particular type of machine. In the event therefore that a smaller machine or different configuration of machine is involved, the operator can indicate to the central monitor unit that a particular sensor is not installed. The monitor unit therefore scrolls through the total series of sensors to be installed and the operator either installs that sensor or indicates to the monitor unit through the key pad that the particular sensor will not be installed. On receiving information from the operator therefore that the sensor will not be installed, the installation procedure is then scrolled to the next sensor for the procedure to be repeated. After the installation is complete, the central monitor unit has stored in its memory information concerning the location and operation of each sensor together with the ID code of that sensor. During normal operation, therefore, the central monitor unit polls each sensor in a predetermined program of polling, addressing that sensor by its own ID code. The polling is therefore properly controlled by the central monitor unit so that each sensor only provides data from its storage when it is polled thus avoiding any possibility of overlap between messages from the different sensors. In order to reduce the length of the polling messages, after the installation is complete, the central monitor unit is programmed to generate an ID number for each of the sensors which is related to the location of the sensor and has a reduced number of digits so as to reduce the length of the message. In one step, therefore, after the installation is completed and at each powering up of the system, initialization of the system includes the step of transmitting to each sensor from the central monitor unit a message or command which identifies to the sensor its ID number which is allocated to that sensor by the central monitor unit. The same initialization procedure requires that the sensor respond so as to confirm to the system that each of the sensors is up and ready for action. In the event that a sensor fails, that is the sensor fails to respond or the sensor fails to provide the necessary data when polled for that data, the central monitor unit identifies that the particular sensor is ineffective or in a fail condition and provides a display of this condition to the operator. As an alternative, the operator may choose to replace a particular sensor, for example, if he is aware that it is damaged. However this occurs, when a sensor is replaced, it will be appreciated that the central monitor unit will not, in the initialization process on power up have information concerning the ID code of that particular sensor.

In the event therefore that on initialization, the central monitor unit fails to receive a response from a particular sensor upon polling that sensor using the ID code of that sensor, at the end of the procedure, the central monitor unit issues a global command requesting any sensors which have not been polled to provide a response giving information of the ID code. The central monitor unit records the information concerning the location and function of the sensor which fails to respond and then, on receipt of a response from the globally commanded sensor, identifies that location and function with the newly responding sensor.

It is therefore possible only to replace one sensor at a time and if it is necessary to replace more than one sensor, this can only be done by repeating the installation procedure by disconnecting all of the sensors and following the installation pattern specified by the central monitor unit.

The system of the present invention therefore utilizes semi-smart sensors which include a processor and some memory. The sensors are therefore more complex than the conventional prior art sensors which simply comprise a transducers connected individually to the central monitor unit. The system is however cost effective due to the decrease cost of harness and connectors and the ease of expandibility.

In a modified arrangement, one or more of the sensors 17, 18, 19 and 20 can comprise instead an actuator which communicates with the central unit 16 in the same manner as set forth above but instead of being used to effect sensing of a parameter, it is used to actuate operation of a machine function. Thus for example the actuator may actuate a solenoid of a clutch. Thus the system shown in FIG. 3 can include a plurality of sensors for detecting various parameters of the machine and also can include a plurality of actuators which are controlled by the central monitor 16 to actuate various components in dependence upon the sensed values. The monitor may also include means to supply data from other sources so the actuators effect actuation of the various components in dependence upon the sensed values and upon data from the outside source.

In a yet further arrangement, one of the sensors of the system shown in FIG. 3 may comprise a more complex control loop system. In one example the control loop system may control a series of depth control elements of a seeder in dependence upon sensed values generated by sensors in the control loop itself. In this complex system, therefore, the monitor would communicate with the individual sensors and possibly with some actuators and in addition would also communicate with the control device. The control device would therefore control the parameter concerned for example the depth and would effect communication of the depth to the central monitor for communication to the operator.

Turning now to the details of the sensor, the plurality of seeding counting sensors 17,18,19,20 are each arranged at a respective one of a plurality of seed transfer ducts 112 so that the seeds passing through each duct are counted by the respective sensor unit and information concerning the number of seeds counted is transmitted from the respective sensor unit to the central monitor unit for displaying information to the operator.

Figure 5:
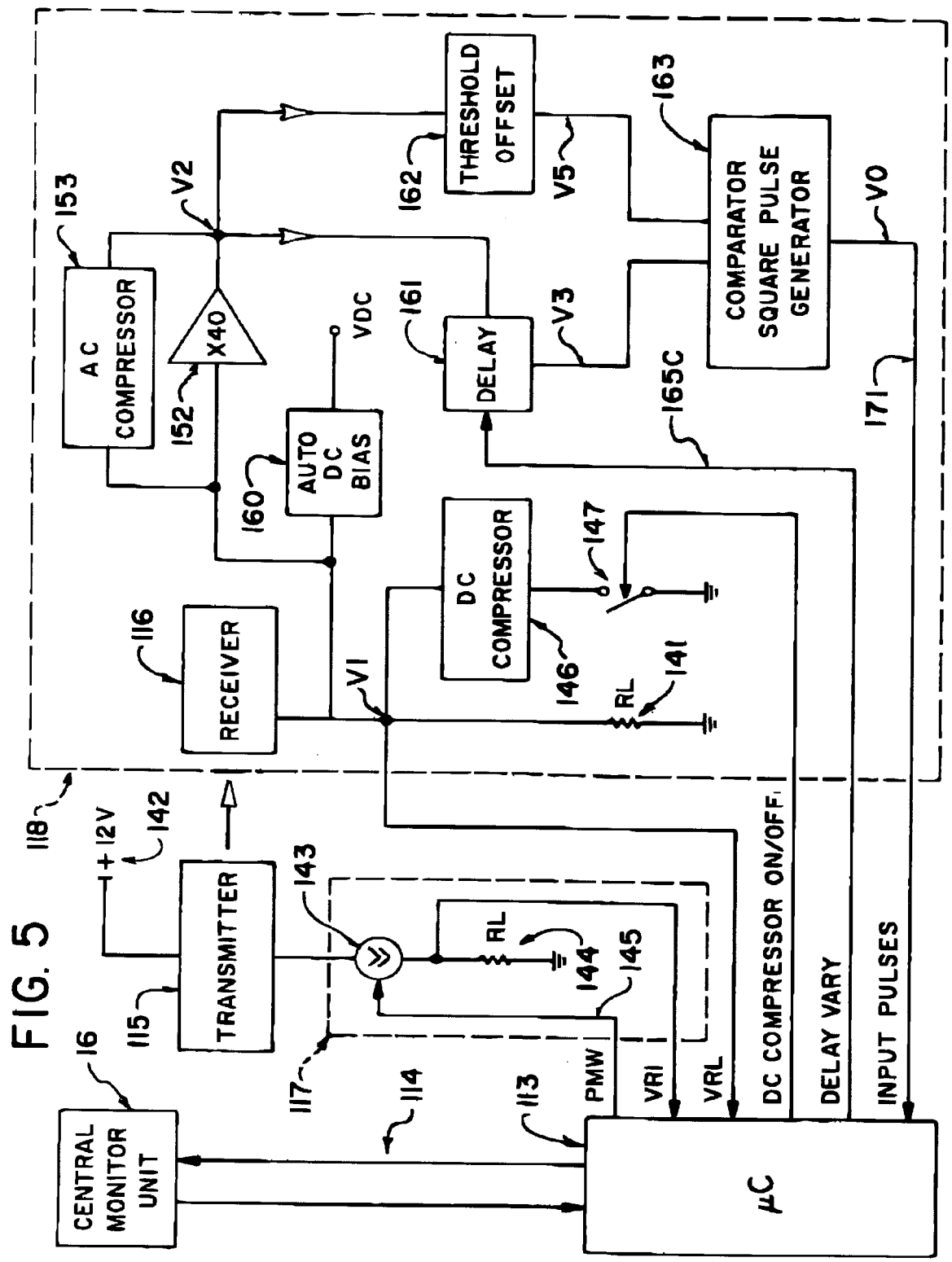
FIG. 5 is a schematic illustration of one seed counting sensor of the system of FIG. 3.

The general construction of each of the seed sensor units is shown in FIG. 5 and includes a microprocessor 113 which communicates with the central monitor unit through a bus generally indicated at 114. The sensor unit further includes a light transmitter 115 and a receiver 116. The transmitter is controlled by the microprocessor and a control circuit generally indicated at 117. The receiver 116 generates a signal proportional to the incident light falling upon the receiver with that signal being modified and analyzed by a receiver circuit generally indicated at 118 and by the microprocessor 113.

Figure 6:
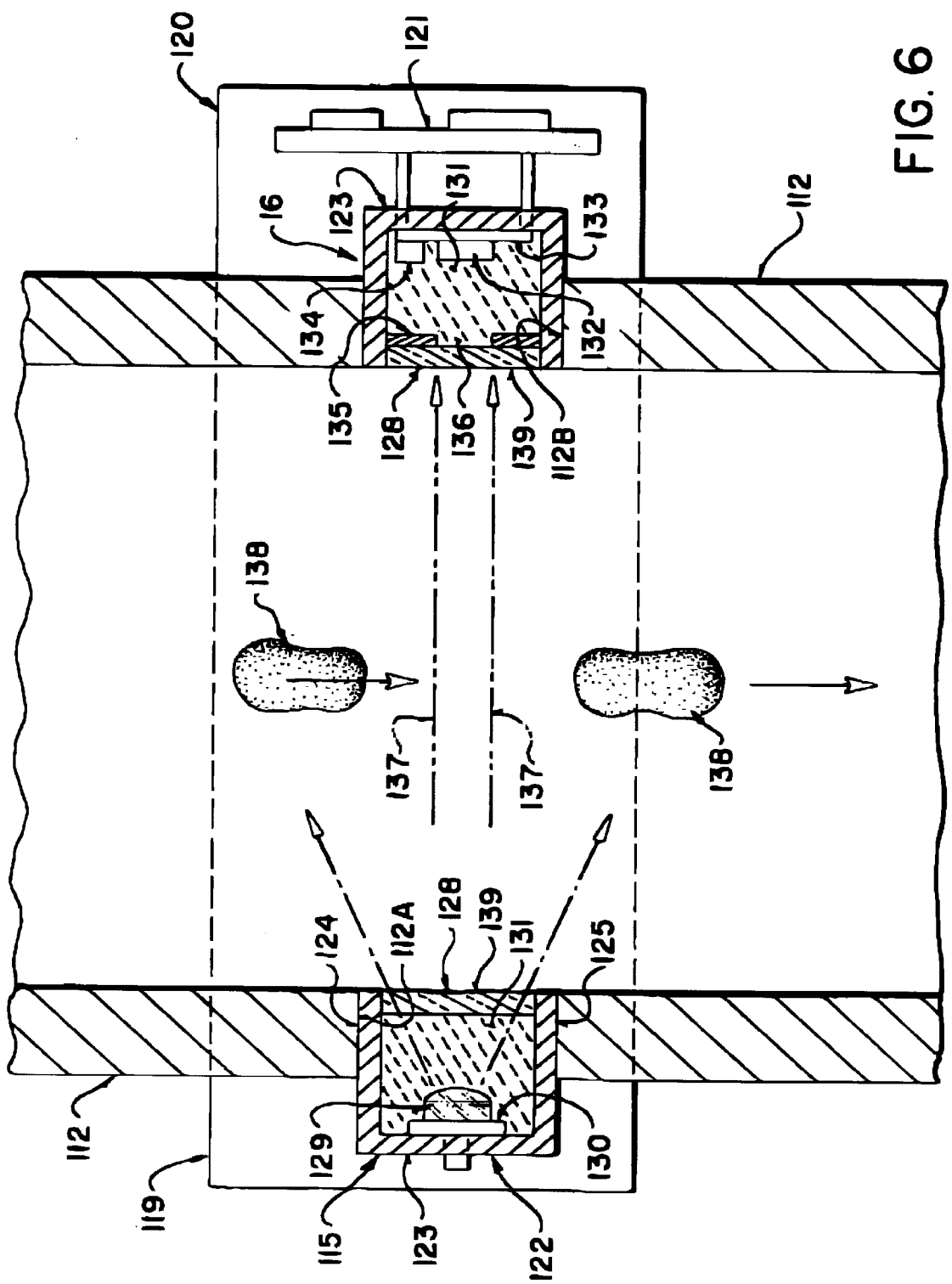
FIG. 6 is a vertical cross sectional view through one seed duct of FIG. 3 showing the construction of the light source and receiver assemblies.
Figure 7:
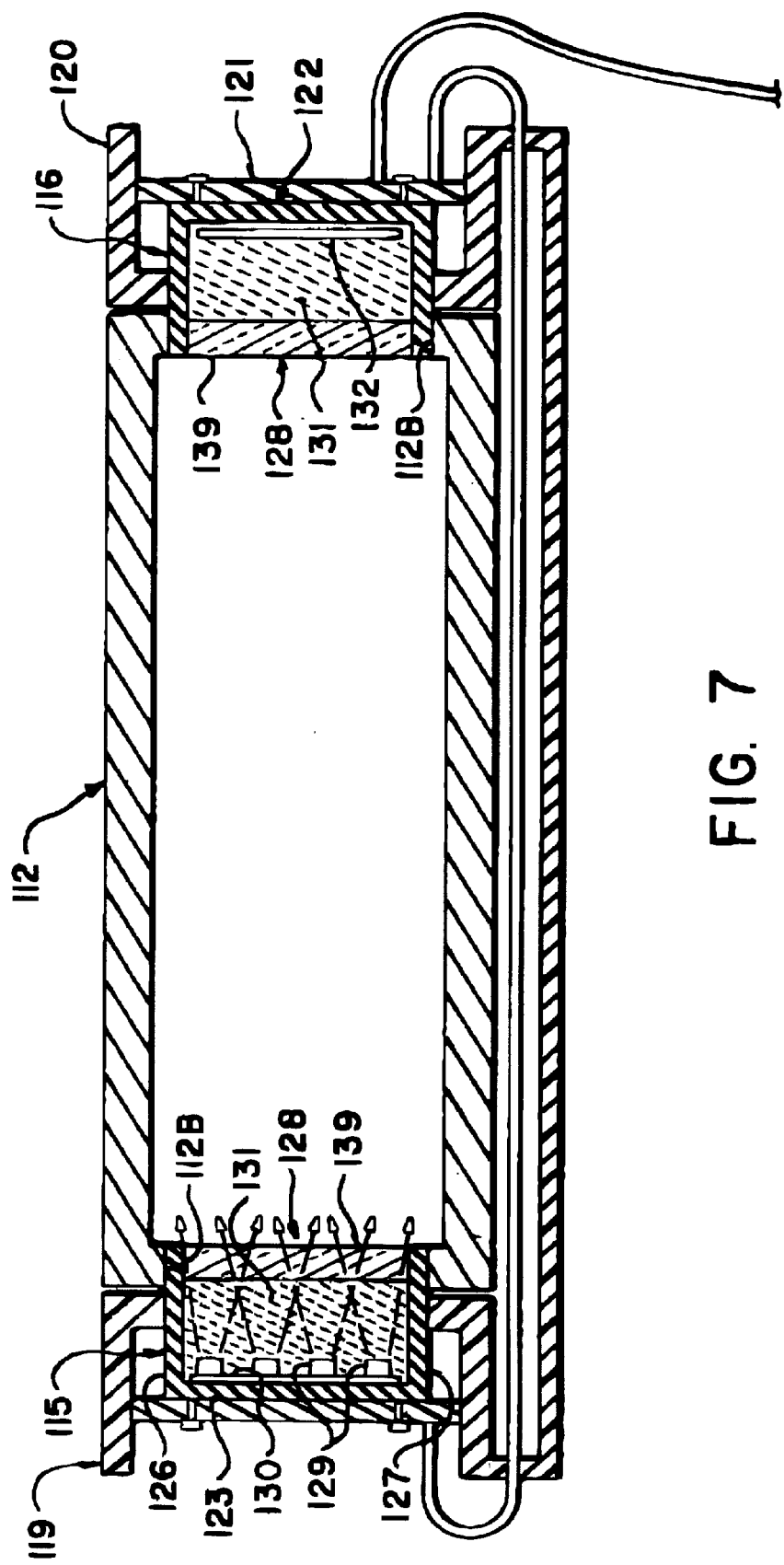
FIG. 7 is a horizontal cross sectional view through the duct of FIG. 6.

Turning now to FIGS. 6 and 7, the construction of the transmitter and receiver combination is shown in more detail mounted in the duct 112. The duct 112 includes openings 112A and 112B which allow the mounting of the transmitter and receiver in the openings in a manner which maintains the duct substantially closed and does not interfere with the flow of seeds or particles through the duct. The transmitter 115 and the receiver 116 are mounted on a plastics molded housing 119 which presses the transmitter 115 and the receiver 116 into the respective opening in the duct 112. One part of the housing 119 includes an expanded section 120 for receiving the circuit board 121 of the circuit 118 and most of the circuit 117.

Each of the transmitter and receivers comprises a channel shaped housing 122 including a flat base 123, upstanding side walls 124 and 125, upstanding end walls 126 and 127 and an open mouth 128. The housing is formed of a ceramic material and defines a body of the order of 4 mm in width by 25 mm in length.

On the ceramic base wall of the transmitter 115 is mounted a plurality of LEDs 129. In the embodiment shown there are four such LEDs arranged at spaced positions along the length of the base wall 123. The LEDs are connected in series by a metallic conductor 130 formed on the inside surface of the base 123. The LEDs project slightly upwardly from the base 123 but are spaced from the open mouth 128 by the depth of the side walls being greater than the depth of the LED. The remainder of the housing outside the LEDs is filled with a potting material which is of an epoxy which is generally translucent to the light emitted by the LEDs. The frequency range of the LEDs and the receiver is arranged to be in the infrared range so as to be different from the ambient light. The potting material 131 filling the housing of the transmitter contains a pigment which tends to filter light outside the infrared range so as to make the system less responsive to ambient light. In an alternative arrangement, the housing may be covered by a glass screen and the potting material does not act as a filter using a pigment.

As shown in FIG. 7, each LED emits light in a generally cone shaped beam diverging outwardly from a line at right angles to the surface of the LED. The depth of the housing is selected so that the beams tend to intersect within the potting material so that the light emerging from the surface of the potting material at the open face of the housing does not contain any dark sections (or blind spots) which are less illuminated. Thus any seed or particle passing through the duct in the area of the transmitter passes through the beam of light generally emerging from the transmitter element without the possibility of such a seed or particle passing through a dark area between two of the LEDs. The transmitter does not use any lens and uses a flat reflector at the base of the housing so as to generate a diffused light source.

The receiver 116 comprises a similar housing with a photo silicon diode 132 formed as an elongate strip across the front face of the base 123 of the housing of the receiver. The strip has a width less than that of the base so that is less than 4 mm in width. Preferably the width of the strip is less than 2 mm and in a particularly preferred arrangement the width of the strip is less than 1 mm and most preferably of the order of 0.5 mm. The photo silicon diode 132 is electrically connected by metallic connectors 133 to a transistor 134 again mounted on the base 123.

At the open face 128 of the housing of the receiver is mounted a glass cover 139 which has an opaque material 135 formed or laid on the inside surface of the glass sheet leaving a central slot shaped opening through the glass through which the light can be transmitted. The width of the slot 136 is substantially equal to the width of the photo silicon diode 132. The remainder of the housing is again filled with the same potting material which is translucent to the infrared light and acts to filter the light outside that range. In an alternative arrangement, the slot is omitted and the width of the opening is the full width of the housing.

The cooperation between the narrow photo silicon diode and the slot 36 thus forms generally a channel 137 for light which can enter the receiver and engage the photo silicon diode. This channel 137 has a length equal to the length of the housing which is substantially equal to the width of the rectangular duct 112. The channel 137 has a width equal to the width of the diode which is of the order of 1 mm. The width of the diode is of course arranged along the length of the duct so that the channel of light which is impinged by a seed 138 passing through the duct is relatively narrow and is again of the order of 1 mm. The choice of the very narrow channel along the length of the duct concentrates the effect of the seed and tends to separate each seed from the next. Thus seeds passing through the duct with the spacing between the seeds of more than 1 mm will appear as two pulses of reduced light intensity at the receiver diode.

The above described arrangement of transmitter and receiver therefore provides an improved optical arrangement with reduced blind zones and covers the cross section of the seed tube with a uniform, narrow beam. The improved receiver looks at the entire cross section of the seed duct. The use of the narrow photo receiver element increases accuracy by being able to discriminate between two closely spaced seeds. At the same time the receiver has good sensitivity and dynamic response. To eliminate ghosting, the sensor limits the amount of entry/exit reflection (stray reflection). The use of the narrow slit mask screened on the back of the glass cover reduces the amount of stray reflections.

Figure 8:
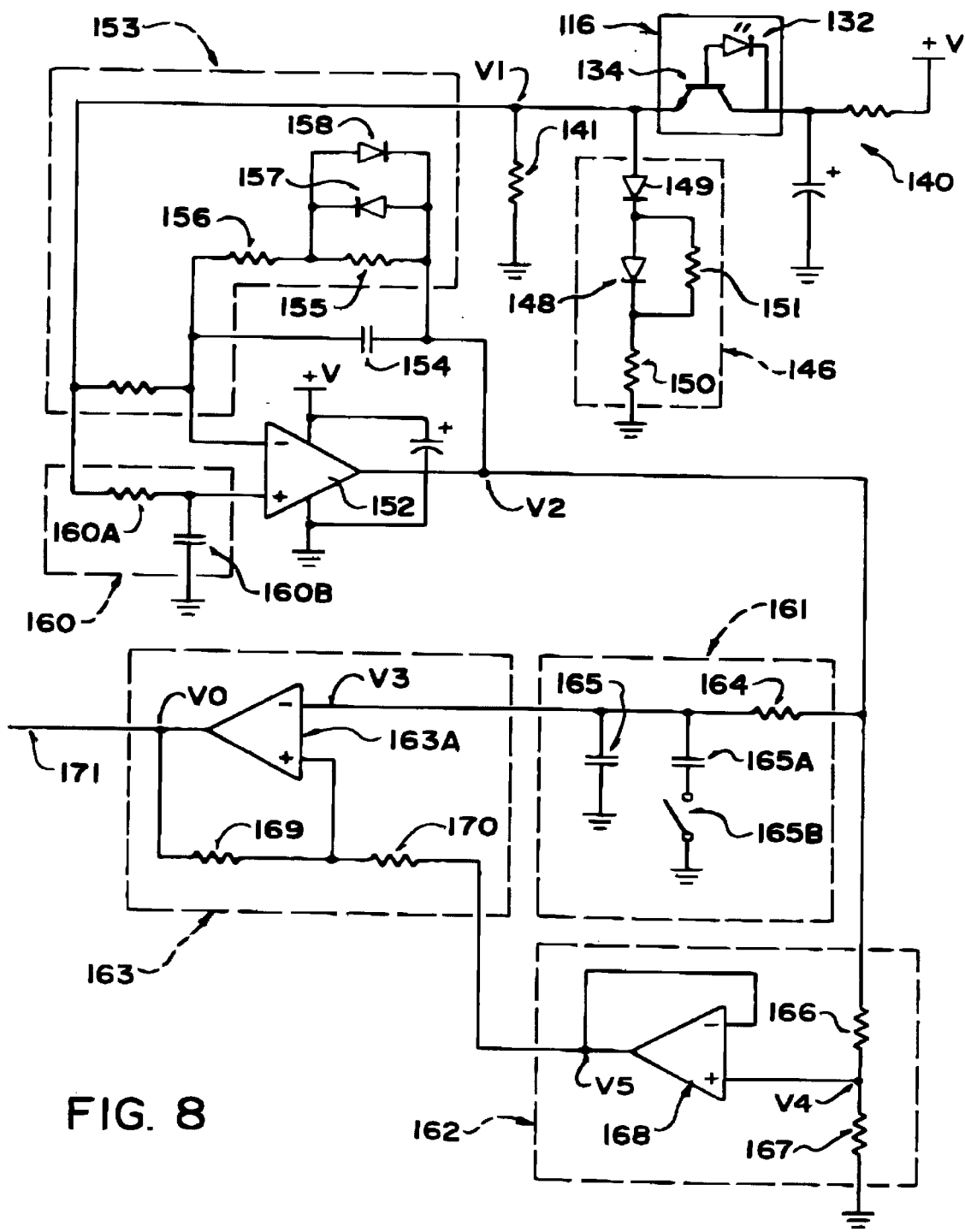
FIG. 8 is a schematic of the receiver circuit of FIG. 5.

Turning now to FIGS. 5 and 8, FIG. 5 provides a block diagram of the general operation of the circuit 117 and 118 and FIG. 8 shows the detail circuit elements of the receiver circuit 118.

Figure 9:
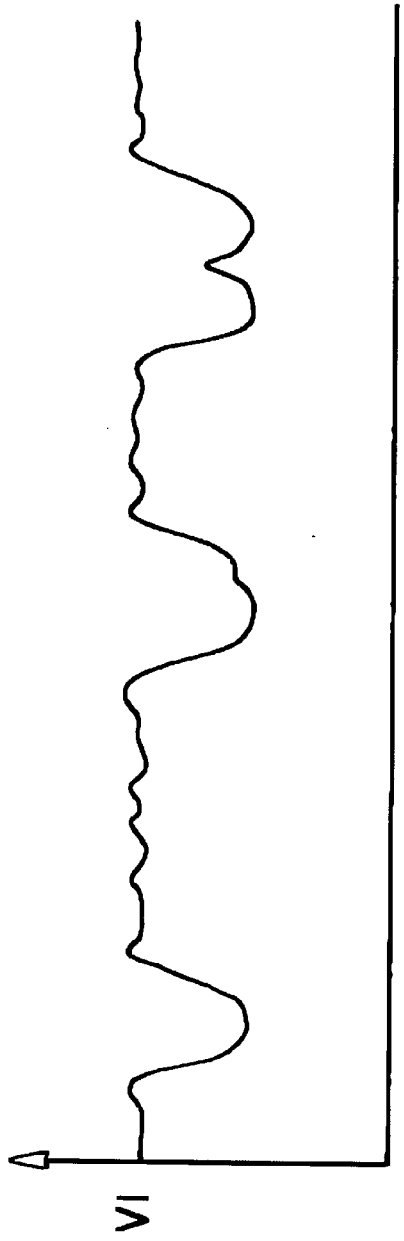
FIG. 9 is a graphic illustration of a typical output signal from the light sensitive diode of FIG. 8.

In FIG. 8 the photo silicon diode 132 of the receiver 116 is shown connected to the base of the transistor 134 with the transistor supplied with current from a source 140. The amount of current flowing through the transistor 134 is thus directly proportional to the intensity of light falling on the photo diode 132. The current from the transistor 134 is applied to a load resistor 141 which generates a voltage V1 which varies in value in dependence upon the light intensity at the photo diode 132. A typical wave form is shown in FIG. 9. The voltage V1 is communicated to an input of a microprocessor.

The transmitter 115 including LEDs 129 is connected to a voltage source 142 so that current passes through the LEDs 129 to ground through a current source 143 and a load resistor 144. The voltage across the load resistor 144 is indicated at VR and this voltage is input into the microprocessor. The current source 143 is controlled by a signal on a line 145 from the microprocessor which signal is a square wave pulse of a variable pulse width.

The microprocessor can thus control the amount of current flowing through the LEDs 129 by varying the pulse width of the square wave pulse supplied to the current source 143. The intensity of the light from the transmitter is thus controlled by changing the current that passes through the LEDs. The microprocessor generates the pulse signal having a duty cycle determined by an algorithm within the microprocessor. The algorithm used determines the condition present at power up and determines the duty cycle to bring the receiver to the optimum level.

This is obtained by initially generating a current through the transmitter which is at a predetermined minimum and by detecting the voltage V1 and comparing the voltage V1 with a reference voltage. In the event that voltage V1 is below the reference voltage due to accumulation of dust or other causes of reduction in intensity of the illumination received, the microprocessor increases the current through the LEDs by varying the duty cycle of the signal on the line 145 to increase the current and therefore the intensity of light transmitted until V1 exceeds the reference voltage.

During the power-up cycle at an initial commencement of operation of the system, the microprocessor carries out the above adjustment function to increase the current through the LEDs. In the event that the current reaches a maximum allowable current as detected by voltage VR and at the same time the voltage V1 is less than the reference voltage then the microprocessor generates an output signal which is communicated on the bus 114 to the central monitor unit to act as a flag to the operator that the sensor unit concerned is ineffective and requires a cleaning.

In addition after the current intensity is determined, the transmitter will pulse the LEDs a number of times, using a current at or near the maximum, while the controller will expect to receive the same number of pulses. This method is used to determine if the tube is blocked and/or the sensor is operational. If the test is not passed, a flag is set to prompt the user to replace or service the sensor. The use of adjusting the current through the transmitter at a minimum for the required output voltage V1 ensures that the transmitter does not receive a greater level of current than is necessary thus increasing transmitter life.

The sensors are therefore checked to determine one of the following states: OK; dirty; blocked or not working; not present.

The current from the transistor 134, in addition to connection across the load resistor 141 is connected across a DC compressor circuit 146 connected in parallel with the load resistor 141 to ground. A switch 147 connected between the DC compressor and ground is actuated by the micro processor for effecting on and off conditions of the DC compressor in accordance with requirements. In particular the DC compressor is maintained in an off condition while the monitoring of the voltage V1 is effected.

As shown in FIG. 8, the DC compressor circuit comprises a pair of diodes 148 and 149 connected in series with a load resistor 150 with a second load resistor 151 connected in parallel with the diode 148.

In operation, when the steady state current is low, the diodes conduct little current through the DC compressor so the impedance of the load, defined by the DC compressor and the load resistor 141, is constituted by the load resistor and is thus maintained relatively high. As the steady state current increases, the current through the diodes is increased so that the load seen by the current emerging from the transistor is decreased thus maintaining the voltage V1 at an automatically biased, substantially constant level. In other words, when the current is very low the DC compressor is in effect turned off so that the loads seen by the current is equal to the high impedance of the resistor 141. When the current is increased, the DC compressor turns on so that the load seen by the increased current is equal to the combination of the impedance of the DC compressor and the load resistor 141 which has a total impedance significantly less than that of the load resistor 141 thus maintaining the voltage V1 at a reduced level. The DC compressor therefore automatically controls the voltage V1 so that it is maintained at a preferred level for application to the remaining parts of the analysis circuit as described hereinafter.

The voltage V1 thus generated by the load across the receiver is communicated to an amplifier 152 which acts to invert and amplify the momentary changes in intensity appearing in the voltage V1 as shown in FIG. 9. With a capacitor connected across the amplifier, the amplifier acts as a low pass filter (lpf). Also across the amplifier 152 is connected an AC compressor circuit indicated at 153 which acts to compress the amplitude of a pulse if that amplitude would be sufficient to cause the amplifier to effect clipping of the pulse. Instead of a pulse having therefore a square top, a compressed pulse follows in shape the shape of the input pulse.

The AC compressor comprises a first resistor 155 and a second resistor 156 in series therewith. Across the resistor 155 is connected a pair of diodes 157 and 158. At lower input signals the gain of the amplifier is about 145. At higher input signals, one of the two diodes turns on gradually and shunts resistor 155 lowering the gain of the amplifier to about 15.

Figure 11:
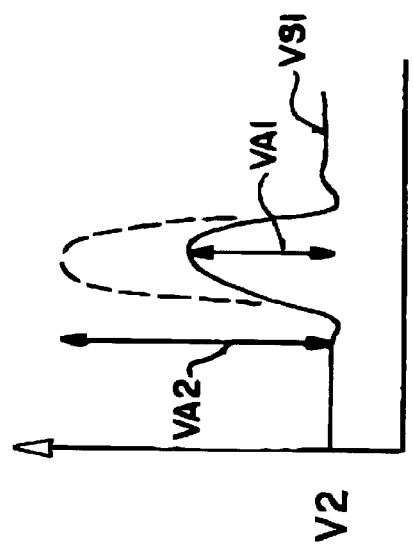
FIG. 11 is a graphic illustration of the voltage V2 of the circuit of FIG. 8.
Figure 10:
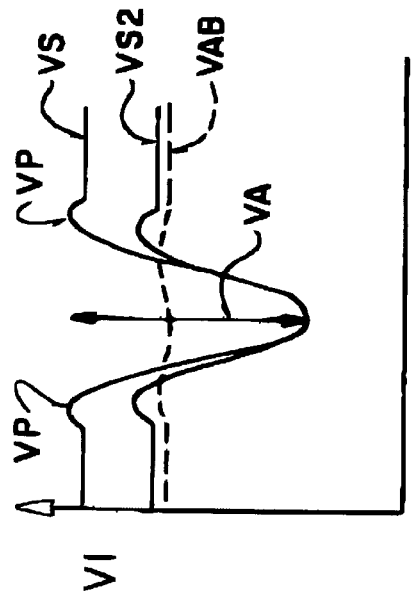
FIG. 10 is a similar graphic illustration of the voltage V1 from the load of FIG. 8.

The effect of the two compressor circuits 146 and 153 is shown by comparison of FIGS. 10 and 11. In FIG. 11 an initial signal V1 is shown having a steady state voltage VS and a pulse having an amplitude VA. It will be noted that the pulse is a negative pulse caused by a momentary reduction in intensity in light received at the photo diode due to the passage of a seed between the transmitter and the receiver. It is noted that in practice the pulse is preceded and followed by a slight positive pulse indicated at VP due to initial and trailing reflections from the seed as the seed approaches and leaves the beam or channel of light passing between the transmitter and the receiver.

The amplitude VA is dependent upon the dimensions of the seed particularly in a direction lying within the beam and at right angles to the direction of movement of the beam. The effect of the DC compressor is shown in which the voltage V1 is limited and reduced to a preferred level VS2.

The steady state DC level is controlled by an auto bias circuit 160 so that the DC bias follows the DC component of the receiver output which is proportional to the amount of average light seen by the receiver. The DC biasing circuit comprises a resistor 160A and a capacitor 160B which allows the bias to float with a slow changing input, compensating for such things like dust accumulation, aging, seed rate, while filtering out short changes. This input to the amplifier is indicated at VAB.

The output from the amplifier as indicated at V2 is shown in FIG. 10. It will be noted initially that the steady state voltage indicated at VS1 follows closely VS2 reduced or compressed by the action of the DC compression circuit 146 and controlled by the auto bias circuit. It will be noted that the pulse is inverted so as to generate a positive pulse above the steady state voltage VS1. Thirdly the amplitude of the pulse indicated at VA1 is decreased relative to an amplitude VA2 by action of the AC compression circuit 153. This compression from a nominal amplitude VA2 to an output amplitude VA1 is effected in the event that the amplitude VA2 would be sufficient to saturate the amplifier and thus cause clipping of the top portion of the pulse. The shape of the pulse thus follows the shape of the initial pulse as shown in FIG. 10 but is reduced in amplitude relative to an amplitude which is equal to VA times the nominal gain.

The output signal V2 from the amplifier 152 is used in two separate circuits to generate two separate signals indicated at V3 and V5. These signals are generated by a delay circuit 161 and by a threshold offset circuit 162. These signals V3 and V5 are submitted to a comparator/square pulse generator circuit 163 which generates a square wave output from the circuit 118 for transmission to the microprocessor 113.

Figure 12:
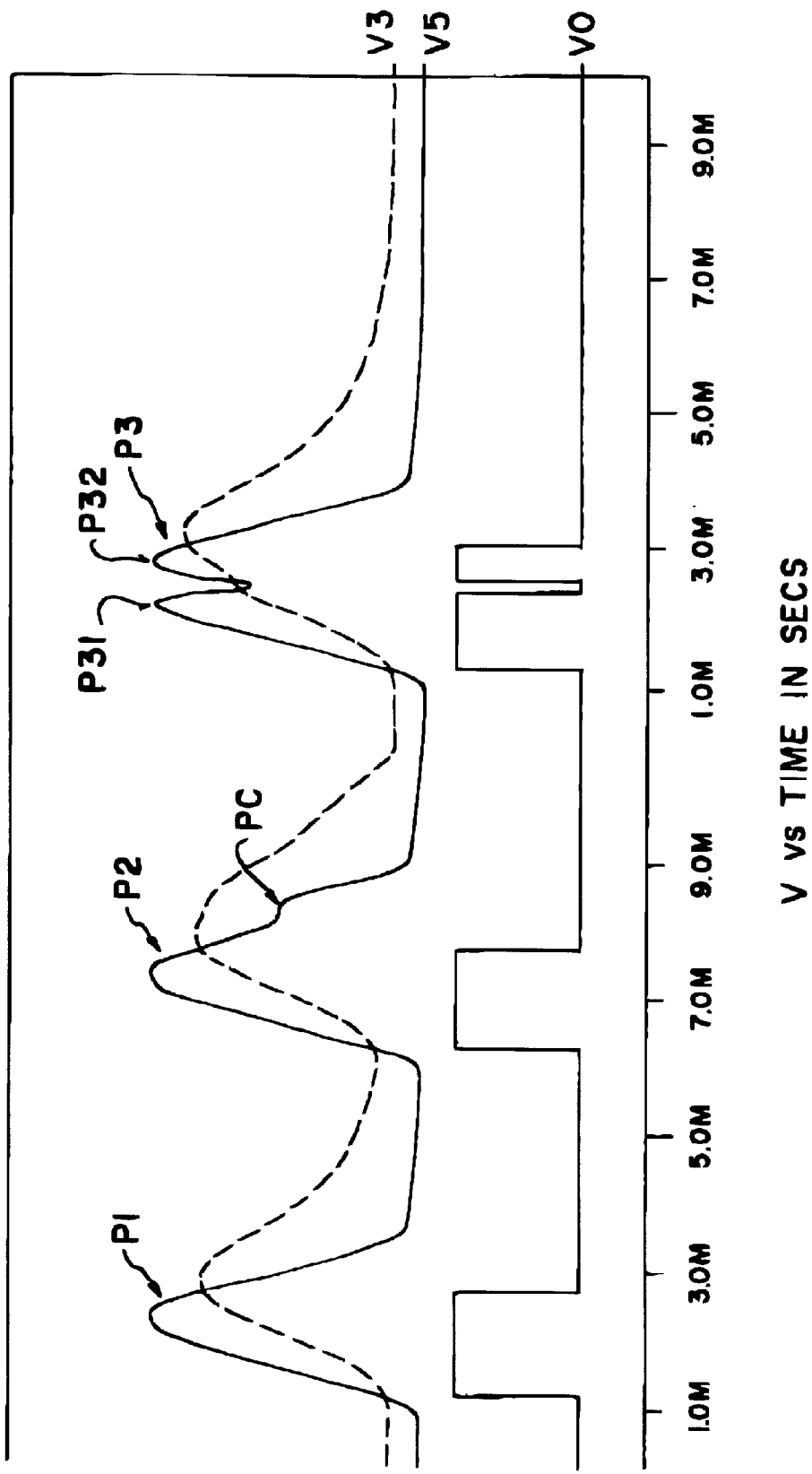
FIG. 12 is a graphic illustration of voltages V3, V5 and V0 for a typical wave form of a circuit of FIG. 8.

The delay circuit 161 comprises a resistor 164 and a capacitor 165 generating a time constant which is dependent upon the values of those elements and acts to delay the pulse V2 by a time equal to the delay constant. This signal is shown in FIG. 12 at the dotted line V3. The amount of delay is selected to be less than the time period of a pulse. The amount of delay can be varied by introducing one or more further capacitors 165A which are controlled by a switch 165B actuated by the microprocessor on a line 165C (FIG. 5). The amount of the delay is selected in dependence upon the type of seed so that the larger the seed, which generates a longer time pulse, the larger the delay selected. Smaller seeds of course have a significantly reduced time period for the pulse and therefore the absolute value of the delay is reduced so that the proportion of the delay relative to the time of the pulse is approximately equal for different seed types.

The threshold offset circuit 162 comprises a first resistor 166 and a second resistor 167 with the resistors connected in series to ground. The threshold circuit may further include an optional amplifier 168. The input to the amplifier 168 is taken from voltage V4 which is a proportion of voltage V2 dependent upon the values of the resistors 166 and 167. The voltage V4 and the amplifier 168 thus generate a threshold offset which acts to provide an output voltage V5 which follows the input V2 but is offset therefrom by a threshold value T.

The absolute value of the threshold varies in proportion to the DC steady state biasing voltage in view of the fact that the voltage V4 is a proportion of the steady state voltage stored by the DC biasing circuit and dependent on V1. The threshold is thus dynamically adjusted by the auto bias provided by the circuit 160 so that it follows the DC level present on the receiver output. Since the amplitude VA1 of the signal is proportional to the light intensity, it is necessary to alter the threshold value to take into account reductions in the amplitude of the signal. The threshold is referenced to the DC bias and is proportional thereto since the threshold represents a fixed percentage defined by the resistors 166 and 167 of the DC bias. Since the DC bias is changed during the operation of the device, the threshold therefore changes in absolute value.

The comparator circuit 163 comprises a comparator 163A, the hysteris of which is controlled by two resistors 169 and 170 connected as shown.

As best shown in FIG. 12, the comparator 16A receives the signals V3 and V5 and generates a square wave pulse at output V0 in response to an absolute comparison of the two signals V3 and V5. Thus it will be noted that the square wave output V0 has a leading edge of the square wave pulse when the signal V5 goes higher than signal V3. The square wave has a trailing edge which is generated at the time when the signal V3 goes higher than the signal V5. This generates a square wave pulse of an amplitude determined by the comparator 168 and of a time period T1 which is dependent upon but not equal to the time period of the pulse P1 as indicated in FIG. 12 and more particularly is proportional to the rise time.

The threshold is selected so that only when the threshold is exceeded is the square wave pulse generated. The threshold is thus selected in dependence upon the amplitude of the pulses and in dependence upon the amplitude of any noise appearing in the signal. The threshold is thus selected to attempt to filter out the noise by selecting only those pulses, generated by actual seeds which have sufficient amplitude to trigger the square wave pulse generator.

It will be noted that the pulse P1 is a smooth pulse of a substantially sine-wave shape which is the theoretical shape which will be generated from a spherical seed passing through the light beam.

However many seeds are not spherical and some seeds, particularly corn, tend to generate a signal of the shape shown at P2. In this shape, the pulse is not sinusoidal but is generally smooth with a change of direction as indicated at PC where the declining edge of the pulse temporarily changes direction to provide either a horizontal or an inclining portion leading to a second peak before continuing the decline to the trailing edge of the pulse. The shape is a common occurrence in corn and is dependent upon the irregular physical shape.

The use of the comparison system set forth above including the delay circuit 161 and the threshold offset circuit 162 allows the selection of a delay which is sufficiently long in comparison with the period of the pulse to ensure that the change in direction PC does not cause generation of a square wave. It will be noted that the delay is sufficient so that the pulse shape shown at P2 generates only a single square wave substantially identical to the square wave for the pulse P1. Thus the delay is set so that it is sufficiently long to avoid generation of a second square wave in response to the change in direction PC. In practice the delay is set so that it is approximately 5 to 10% of the period of the pulse for the type of seed concerned.

It is clear therefore that the comparator of the present invention does not follow each change in direction of the signal but instead selects only those changes in direction which are analyzed to arise from two seeds as explained hereinafter. Changes in direction such as that shown at PC are therefore ignored.

Turning now to the third pulse P3 which is shown as two separate pulses overlapping due to the partial overlap between two seeds as they pass the sensor, two separate square wave pulses are generated by the comparison circuit explained above. In this case the separation of the two pulses P31 and P32 is sufficient that the delay is insufficient to hide the change in direction between the pulses.

The output V0 is therefore a series of square wave pulses which are theoretically equal to the number of seeds passing the sensor. However, of course, the pulses are affected by noise generated by spurious reflections and the pulses may arise from the partial overlapping passage of two or more seeds. While the above analysis effected by the comparator provides a first selection of those pulses which are representative of multiple seeds, certain characteristics of the seeds have been found in practice to generate pulses which are not properly representative of the single seeds.

The microprocessor is therefore arranged to carry out a further calculation in regard to the square wave pulses received on the line 171 at the output of the comparator. The microprocessor is therefore arranged to carry out a calculation of the average time period of the square wave pulses defined by signal V0.

The microprocessor then uses the average period to count seeds as follows:

a) If the time period of a pulse received is less than one half of the average time period then the pulse is counted as zero seeds, that is the pulse is discarded as spurious. Such spurious pulses can be generated by small amplitude noise or by a change in direction such as PC which is sufficient in time to trigger the generation of a short square wave pulse since it is slightly greater than the delay period.

b) If the pulse period is greater than half the average period and less than 1.5 times the average period then the square wave pulse is counted as a single seed.

c) If the pulse period is greater than 1.5 times the average pulse period then the pulse is counted as two seeds. It will be appreciated that a double period pulse can be generated when the pulses from two seeds overlap but there is insufficient decline in amplitude in the area between the pulses to trigger the threshold. In such a case only a single pulse is generated but it has a very long period.

The microprocessor thus generates a seed count value which is calculated from the input pulses from the receiver and which is representative of the number of seeds passing by the receiver. In view of the necessity for analysis of the signal, it is of course not possible to provide a seed count value which is exactly equal to the number of seeds but the above analysis techniques have been developed to provide a seed count value which is as close as possible to the number of seeds while accommodating the variations between different seed types.

In order to modify or tune the analysis circuit in response to different seed types, the microprocessor is programmed to calculate the rate of receipt of the square pulses V0 and the average time period and to modify the delay on line 165C as explained previously. Thus the delay is decreased when the rate of pulses is above a predetermined value and is increased when the rate of pulses is below a predetermined value. The microprocessor can set a number of such predetermined values to provide a plurality of different delays. It will of course be appreciated that the rate of passage of seeds is related to the size of the seeds since smaller seeds are seeded at a higher rate.

While the microprocessor is programmed to normally accommodate different seed types by the above calculation, it is also possible to enter an override situation from the central monitor unit which acts to instruct the microprocessor in regard to special seeding conditions or the like. In particular when seeds are seeded in clusters which is necessary for some seed types, the microprocessor can be instructed from the central monitor unit to override the internal algorithm and to provide a particular delay period different from those which would be normally calculated by the microprocessor.

A further embodiment of sensor circuit is shown in FIGS. 13 to 17 in which the detection circuit comprises a photo-diode 213 which provides an output to a logarithmic amplifier 216 which in turn provides an output at a point A in the circuit. The output from the logarithmic amplifier is supplied to an AC amplifier 217 which provides an output at a point B in the circuit. The output at point A is also connected to a DC amplifier 218. The outputs from the DC amplifier and from the AC amplifier are connected to a comparator 219 which provides an output at a point C in the circuit as shown in FIG. 13B.

The circuit further includes a microprocessor schematically indicated at 220 as shown in FIG. 13B which receives the outputs B and C and carries out a further analysis of the signals at those points in the circuit as explained hereinafter.

Figure 13A:
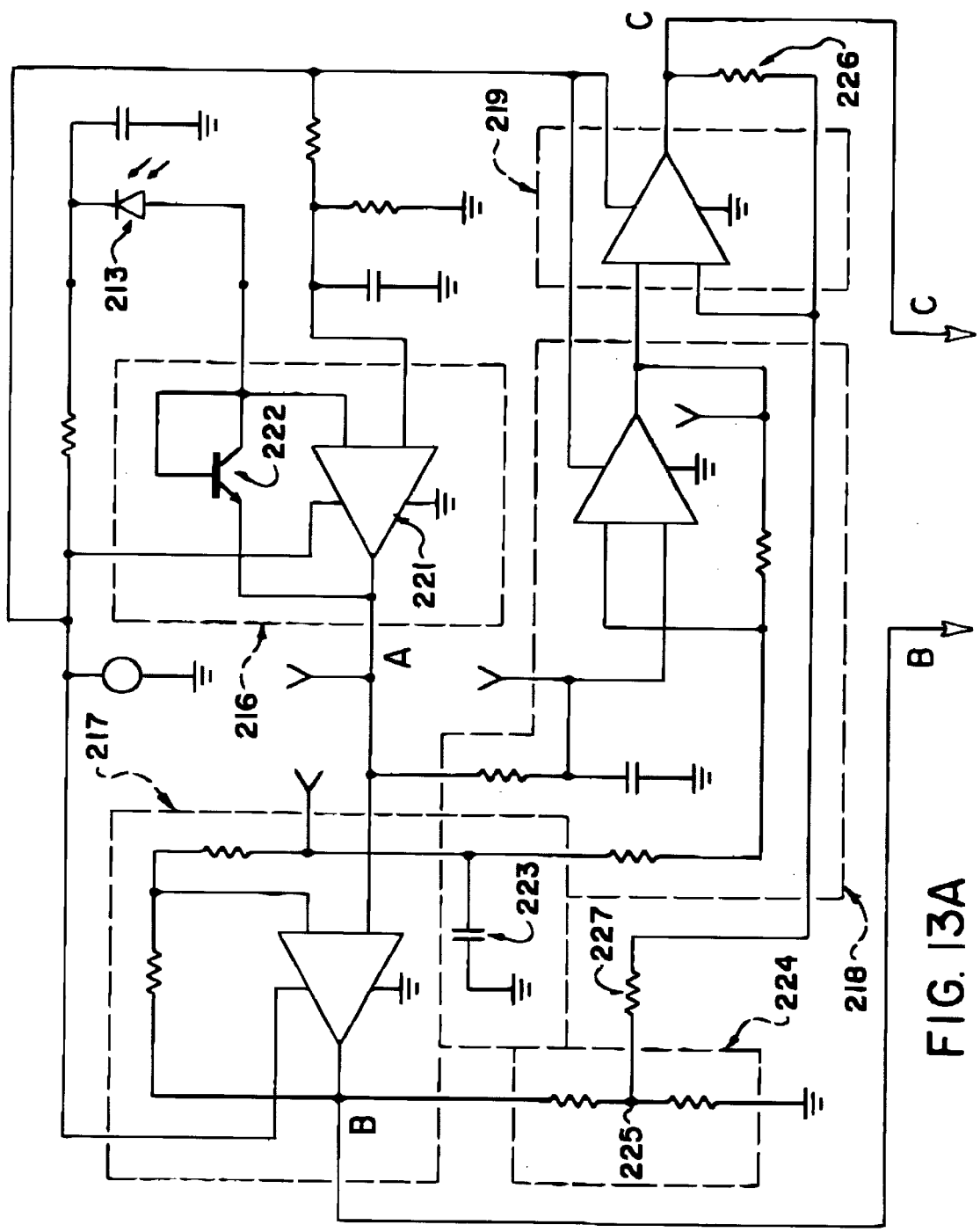

Referring to FIG. 13A, the logarithmic amplifier 216 includes an amplifier element 221 and the transistor 222 with the transistor connected in a feed back loop to the amplifier 221. This circuit is a known arrangement and provides an output voltage at point A which is proportional to the logarithm of the input current from the sensor. This circuit therefore provides output pulses which are proportional to the depth of modulation of the steady state light intensity. In this way the amplitude of pulses remains at a value which is independent of the amount of steady state light which varies in dependence upon various factors including the accumulation of dust in the source and sensor system. This logarithmic effect is well known and well established and is explained for example in the textbook Nonlinear circuits Handbook by Analog Devices for use in optical devices of this type where the steady state light intensity can vary.

The output at point A includes an AC component and a DC component. The AC component is constituted by the individual pulses. The DC component is constituted by variations in the steady state signal. The AC and DC components are separated by a decoupling capacitor 223 which forms part of both the AC amplifier 217 and the DC amplifier 218.

The AC amplifier 217 is of a conventional construction well known to one skilled in the art with a suitable feed back arrangement so that the output at point B is directly proportional to the input so the pulses are amplified by the gain across the amplifier.

The output at point B is connected to ground through a voltage divider 224 so that a voltage at point 225 is connected to the positive input of the comparator circuit 219. The voltage divider acts to take a proportion of each pulse for comparison with a threshold supplied to the negative input of the comparator circuit 219. The voltage divider 224 comprises two resistors again in a well known arrangement.

The DC amplifier 218 receives the output at point A and communicates this to the positive input of the amplifier through a low pass filter. The negative input of the amplifier is connected in a feed back loop which is also connected to the decoupling capacitor 223 so that the DC amplifier is also responsive to the voltage across the capacitor 223.

The DC amplifier therefore generates at the output of the amplifier a threshold voltage for comparison with the proportion of the pulses from the divider 224. The threshold voltage is dependent upon the DC input level from the output A and is also dependent upon the voltage across the capacitor 223 so that the threshold used for comparison varies in accordance with variations of these components. The comparator circuit 219 generates a square wave with a leading edge generated when the amplitude of the proportion of the pulse exceeds the threshold value. The trailing edge of the square wave is generated when the amplitude of the pulse falls below the voltage of the threshold minus hysteresis value. Resistors 226 and 227 act to control the hysteresis of the comparator so that once triggered at the leading or trailing edges, the comparator is not triggered to the opposite state unless the opposite voltage exceeds a predetermined minimum. In this way noise is filtered.

At point C therefore is generated a square wave having a time period between the leading and trailing edges which is proportional to the time period of the individual pulses.

The gain of the DC amplifier is substantially equal to and preferably exactly equal to the gain of the AC amplifier. The comparison is effected by taking a proportion of the AC pulse and comparing this to a threshold which is in effect a steady state value modified as discussed hereinafter. This is in functional terms the same as generating a raised threshold value and comparing this with the actual pulse amplitude. In both cases the end result is that the pulse must exceed in amplitude a predetermined raised threshold relative to the steady state signal before the pulse triggers the comparator to generate the square wave signal.

Figure 14:
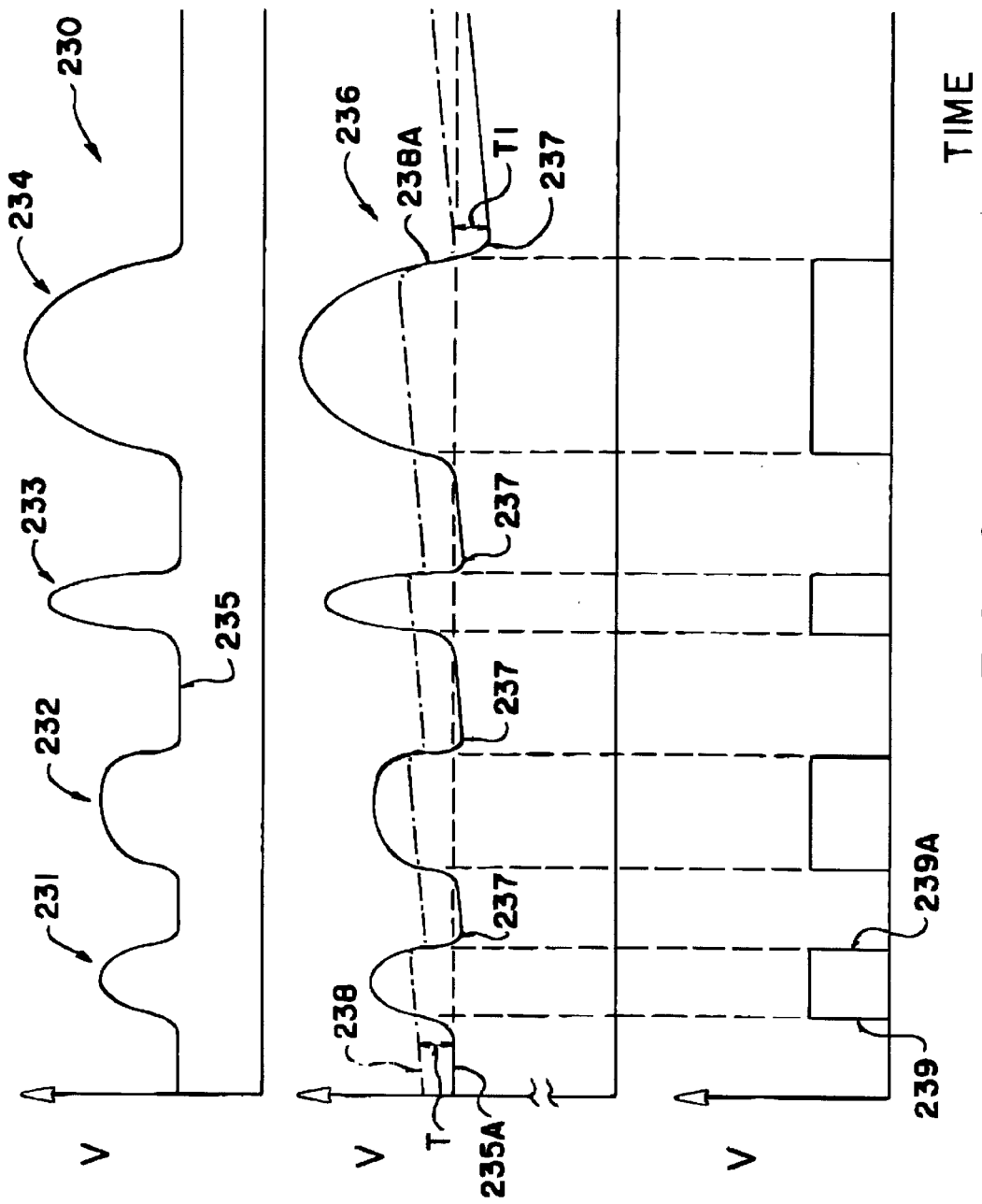
FIG. 14 shows typical wave forms from the circuit of FIG. 13 at points A, B and C respectively.

Turning now to FIG. 14, there is shown a series of pulses indicated generally at 230 which are taken at point A in the circuit. These pulses include schematically illustrated four pulses 231, 232, 233 and 234. (The relative values of the DC and AC components are exaggerated for convenience of illustration). Pulse 231 is intended to show that generated by a normal seed. It will be noted that pulse 232, representing two seeds following each other, has an increased time period but the same amplitude as pulse 231. Pulse 233, representing two seeds side by side, has an increased amplitude relative to both pulses 231 and 232 but the same time period as pulse 231. Pulse 234 has both increased amplitude and time period, representing a combination of pulses 232 and 233. The steady state is indicated at 235 and this is shown as a straight line but of course it will be appreciated that the straight line condition will not occur due to the presence of noise. However in most cases the individual pulses generated by the passage of one seed or multiple seeds generates a discernible pulse of the type in the straighted at 231 to 234.

At 236 is shown the same pulses at the output of the amplifier 217. These pulses are of course proportional to the input pulses but significantly increased in voltage. It will be noted however that the output is distorted by the presence of the decoupling capacitor 223. This distortion generates at the trailing edge of each pulse a decrease in voltage as indicated at 237 which is caused by the recharging of the decoupling capacitor 223. Thus the voltage decreases beyond the base level at 235A and then gradually climbs back to the base level as the capacitor charge is restored with a time constant dependent upon the relevant resistors.

While this distortion is relatively small in response to relatively small pulses such as those at 231, 232 and 233 due to the relative low change of the level of total charge on the capacitor, a large pulse such as that indicated at 234 generates a significantly high level of distortion as shown by the significant decrease in voltage at the trailing end of the pulse.

This distortion must be accommodated in the threshold level with which subsequent pulses are compared or the output from the comparison will be also significantly distorted.

As shown in FIG. 14, the threshold is indicated at 238. This threshold is generated taking into account the distortion generated by the pulse on the decoupling capacitor and includes a decreased portion 238A at the trailing edge of each of the pulses and particularly the largest pulse 234. In other words the threshold is arranged by the circuit explained above so that the threshold follows the distortion while otherwise maintaining a substantially steady state value proportional to the DC value of the input at point A.

The voltage divider 224 acts to shift the pulses downward relative to the threshold 238 so that the steady state is maintained at a predetermined voltage difference below the threshold. The threshold value T which is the difference between the steady state level on the divider 224 and the DC voltage of the DC amplifier is also varied in dependence upon the value of the steady state voltage at point A so that the threshold value T becomes larger as the steady state voltage increases.

In the lowest part of FIG. 14 is indicated the output from the comparator 219 which is in the form of a series of square pulses having a leading edge 239 and a trailing edge 239A. The leading edge is generated at the point where the amplitude of the pulse exceeds the threshold value 238. The trailing edge 239A is generated at the point where the amplitude of the pulse falls below the threshold value 238 minus the hysteresis. The period of the square pulses is therefore proportional to the period of the detected pulses.

The effect obtained by varying the threshold to follow the distortion of the amplified pulse is particularly advantageous in regard to the presence of pulses immediately following the large pulse 234. In view of the large distortion immediately after the pulse 234, a pulse would, if the threshold were not varied, be underestimated in regard to its period and also in regard to particularly small pulses, the pulse may not reach the threshold and thus may be overlooked. The variation of the threshold to follow the distortion ensures that the threshold value T1 in the area of the distortion is substantially equal to the threshold value T in the absence of the distortion.

Turning now back to FIG. 13A, the output of the comparator at point C which is shown in the bottom part of FIG. 13A is supplied to the microprocessor 220. The microprocessor 220 (FIG. 13B) includes an element 239A for measuring the pulse length between the leading edge 239 and the trailing edge 240 of each pulse as received. This length is detected digitally so as to generate a number representative of the pulse length.

In addition, the microprocessor receives an input from point B of the detection circuit so as to receive the amplified pulses prior to their comparison to form the square waves which of course have an amplitude which is constant independent of the actual amplitude of the pulses. The input of the pulses is supplied to an element 241 of a microprocessor which acts as an analog to digital converter.

Figure 15:
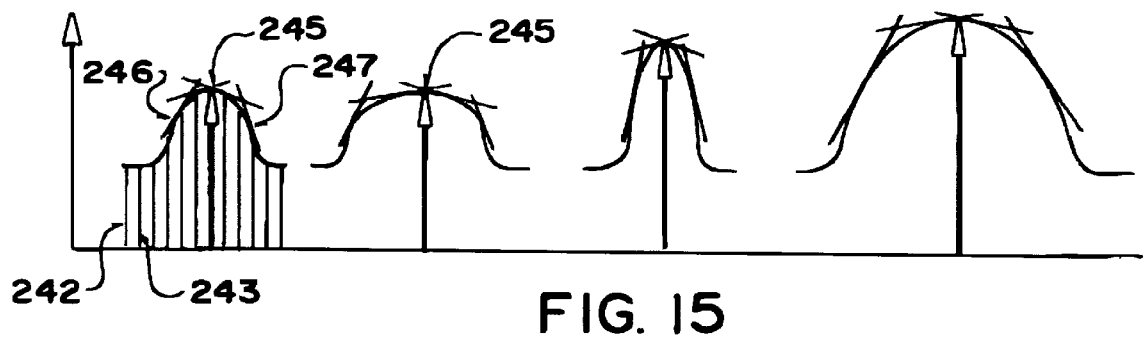
FIG. 15 shows the analysis of a typical wave form from the circuit of FIG. 13 to identify the maximum amplitude of the pulses.

As shown in FIG. 15, the A/D converter 241 generates repeatedly a digital value of the amplitude of the pulse as indicated at points 242, 243 et seq of the pulse. The output from the A/D converter is supplied to an element 244 of the microprocessor which acts to compare sequential amplitudes and thus to determine for each pulse the maximum amplitude as indicated at 245 which is determined by identifying a point where the increase in amplitude as indicated by the lines 246 changes to a decrease at amplitude as indicated by the lines 247.

The microprocessor therefore generates at the element 244 a digital signal proportional to the maximum amplitude of the pulse and the element 240 provides an output proportional to the pulse length. These calculations are effected in real time so that the outputs are available substantially immediately after the trailing edge 239A.

As shown in FIG. 13B the microprocessor provides two paths for calculating from the pulse length and from the amplitude outputs. Each is supplied to a respective comparison element including a comparison element 248 which compares the output value of the pulse length with an average pulse length. Similarly a comparison element 249 compares the amplitude with an average amplitude. An output is provided which is indicative of a ratio of the pulse length relative to the average pulse length and this is supplied to an analysis element 250. The analysis element 250 receives the outputs from the comparison elements 248 and 249 and carries out an analysis based upon those inputs to provide calculated outputs based upon the parameters of the pulse as to whether that pulse is generated by a single seed or by a multiple passage of seeds.

An initial evaluation to determine the number of seeds generating the pulse being analyzed is generated by a simple table in which the ratio of the pulse relative to the average pulse is compared to a series of ranges and each range is determined empirically to relate to a predetermined number of seeds from zero through one seed up to a maximum of five seeds.

A second simple analysis is effected in a similar manner utilizing the ratio of the amplitude to the average amplitude to again compare the ratio to a predetermined series of ranges and to calculate a seed count from zero to five.

At the same time the element 250 acts to compare the seed count generated by comparison of the pulse length with the seed count generated by the amplitude and determines a final seed count based upon the range in which the two parameters fall. In particular, the system is arranged to give priority to the pulse length so that when an additional seed is added in dependence upon pulse length, a further additional seed is not added for a large amplitude. In addition, the amplitude of the longer pulse is not included in the calculation of average pulse amplitude.

Those pulses which are determined to relate to a single seed are output from the element 250 and supplied to elements 251 and 252 which use the single seed pulses to calculate the average amplitude and the average pulse length respectively. Thus the pulses which are determined to be generated by multiple seeds are ignored in the average calculation. The average determined by the elements 251 and 252 are supplied to the comparison elements 249 and 248 for the comparison as described above.

The microprocessor 220 further includes a counter 253 which counts the total number of pulses to provide a total indicative of the total number of seeds. Thus the single pulse output from the element 250 is supplied directly to the total counter for counting single pulses. The multiple output from the element 250 is supplied to a pulse generator element 254. The pulse generator 254 has two functions. Firstly it provides an output to further counters 255, 256 and 257 which count respectively pulses related to two seeds, three seeds, and four seeds. In addition therefore to the total counter 253 being indexed to the total number of seeds, each time a double pulse is identified, this double pulse is counted in the double pulse counter 255. Similarly each time a triple seed pulse is detected, the triple counter 256 is indexed.

In this way a readout element 258 can be actuated to read the total counter 253 and to read each of the multiple counters 255, 256 and 257. This will provide to the user an indication of the regularity in the flow of seeds, as to whether the flow consists of individual seeds or seeds flowing in bunches, and if the latter, the size of the bunches.

The pulse generator 254 also acts to generate extra pulses for counting by the total counter 253 in the event that a pulse generated by multiple seeds is identified.

Figure 16:
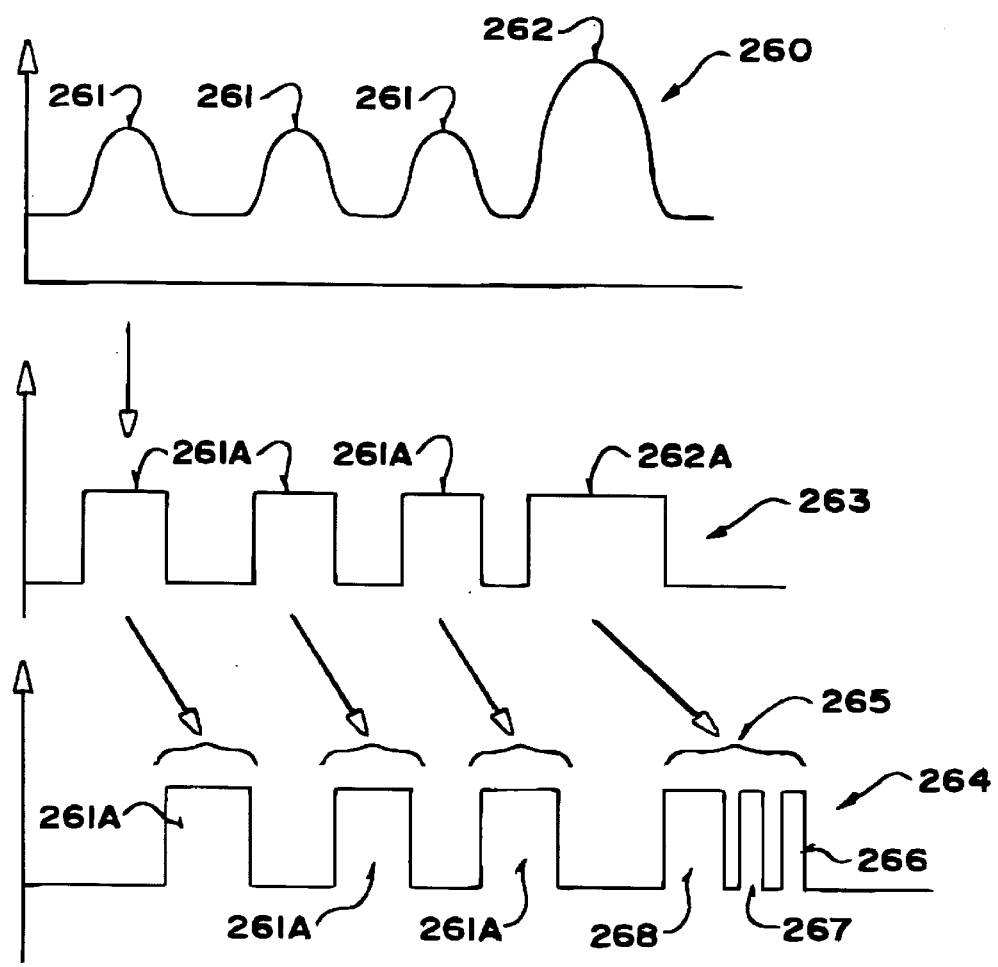
FIG. 16 shows the analysis of a typical wave form including the outputs at points A, C and D of FIG. 13.

Thus in FIG. 16 there is indicated at 260 a series of pulses including pulses 261 which relate to single seeds. There is also a pulse 262 which relates to multiple seeds. The output from the comparator is indicated at 263 and includes pulses 261A which have a pulse length approximating to the average pulse and from which the average pulse can be calculated. The square pulse 262A is of increased length. The comparator elements 249 and 248 and the analysis element 250 effect analysis of the pulses so as to indicate that the pulses 261 relate to a single seed and the pulse 262 relates to multiple seeds. The analysis further indicates that the pulse 262 relates to a triple in that three seeds are simultaneously passing the sensors in order to generate the pulse 262. The element 250 emits the pulses 261A as indicated at 264 in FIG. 16 to the total counter 253. The pulse generator 254 generates a multiple pulse 265 which includes two extra pulses 266 and 267 and a pulse element 268. The pulse element 268 is equal to the average pulse while the extra pulses 266 and 267 are used for counting purposes only and are therefore of short duration. It will be noted that the analysis of the pulses 261 and 262 occur immediately after the trailing edge of the pulse.

Figure 17:
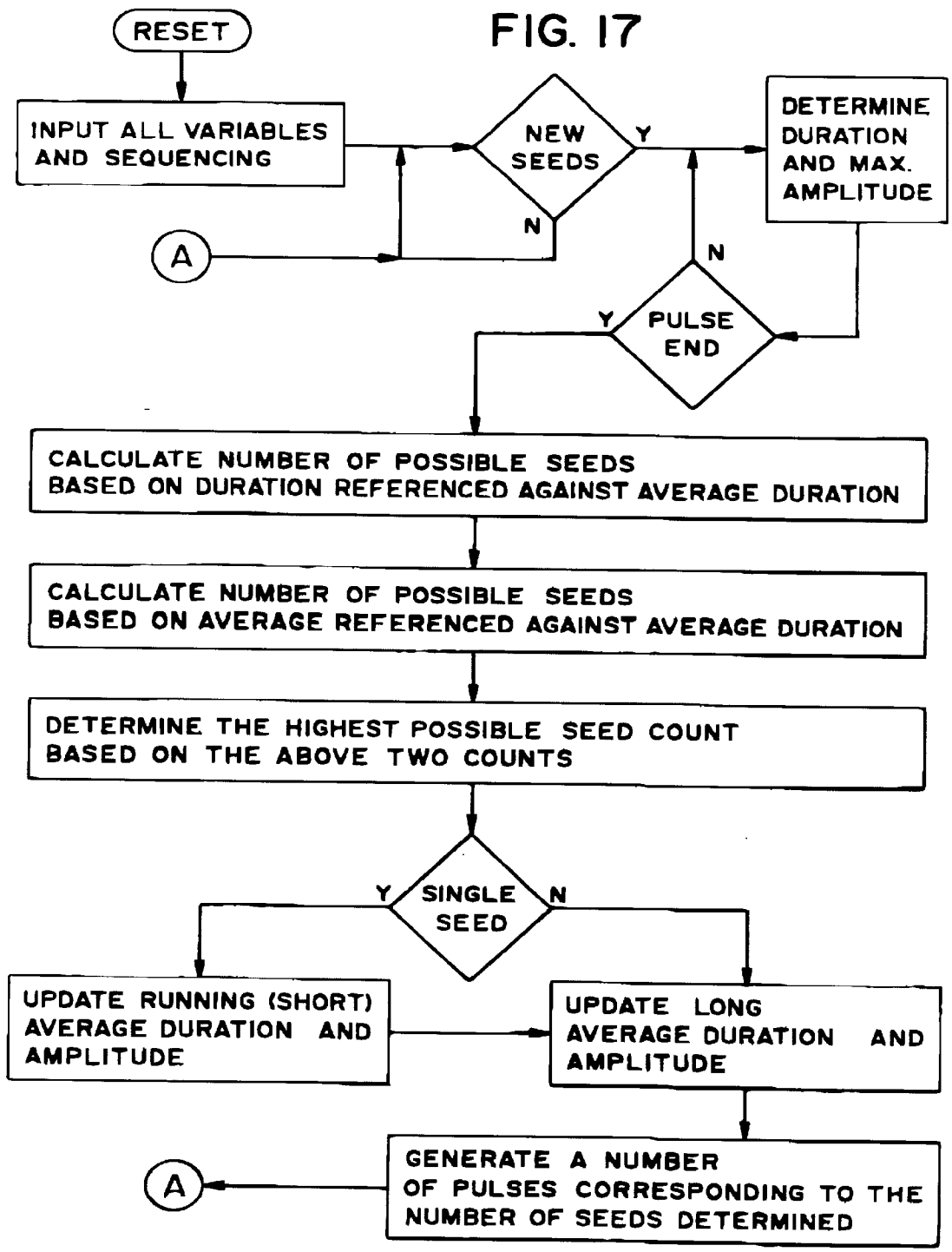
FIG. 17 is a flow chart showing the analysis of the wave forms using the apparatus of FIG. 13.

Turning now to FIG. 17, there is shown a flow chart for the operation of the microprocessor 220 as described above. The operation of the flow chart is self-explanatory except for the following additional comments. The controller 220 keeps two sets of average numbers (amplitude and duration).

One is allowed to change more rapidly (called short average) with every event judged to represent a single seed. This is needed to compensate for short time inconsistencies in the seed meter (dispensing system) that change the seed speed and flow pattern. The second set of averages (called long averages) are affected by all signals representing seeds. This is needed to allow the sensor to adapt to different types of seeds.

Figure 18:
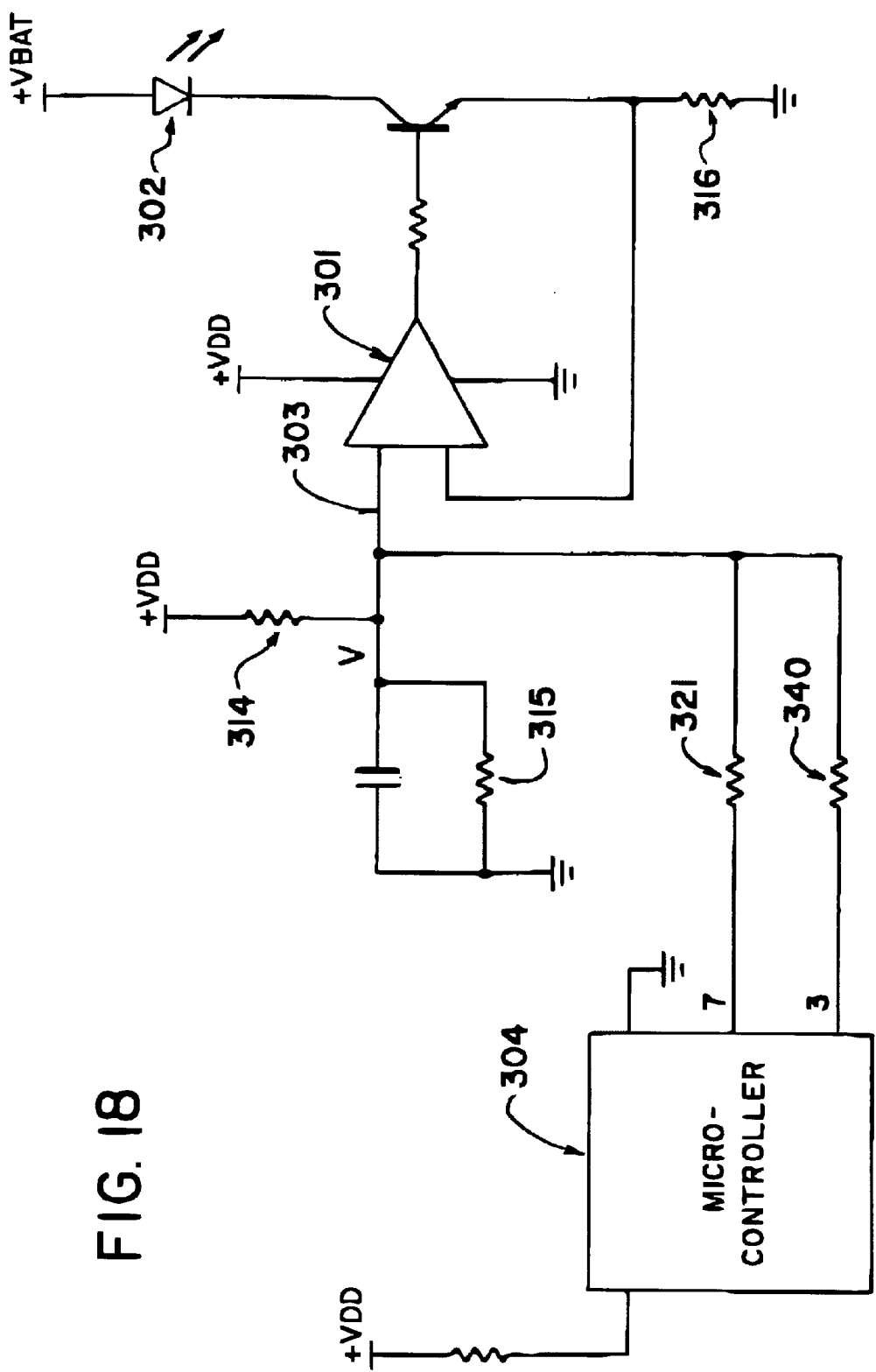
FIG. 18 is a circuit schematic showing the transmitter power supply circuit of the embodiment of FIG. 13.

Turning now to FIG. 18, there is shown a transmitter current supply circuit including an amplifier 301 supplying current to the transmitter 302. The voltage V on the non-inverting input 303 of the amplifier 301 is used to control the current through the transmitter 302. The inverting input of amplifier 301 is connected to a current sensing resistor 316. The current source generates current through the transmitter which is equal to the voltage V divided by the resistance of Resistor 316.

A voltage divider defined by the resistors 314 and 315 determines the dc current (30 mA).

The outputs 3 and 7 of the microcontroller 304, which is the same microprocessor which controls all the sensor functions, are connected through resistors 321 and 340 to the divider. The output 3 is the open drain of the CMOS—transistor and is used to produce 60% modulation of the current. The output 7 is the logic output and is used to produce 5% modulation.

In a similar manner to that previously described, the current supply is modulated by the microprocessor to provide a self calibration or self test system at power up to ensure proper operation of the sensor and to provide a flag to the operator in the event that the sensor does not operate as required.

The self calibration process begins after all voltages are set. The Controller 304 provides a pulse at its output 7. The period of the pulses are the same or close to the period of the pulses of seeds. If the controller sees the output pulses from the receiver, the sensor is working and the optical channel is clean. The self calibration process is done and system is ready to operate. Another option is to send a predetermined number of pulses and check the number of pulses on the output of the receiver.

If the controller 304 does not see the pulses on the output of the receiver, it stops the pulses on output 7 and begins to pulse output 3. The appearance of the pulses on the output of the receiver means that the optical channel is dirty and the controller 304 generates a warning flag for communication to the monitor unit for indication to the operator that cleaning of the sensor is required. However, the system is continuing to operate.

If the controller does not see pulses on the output of the receiver during this modulation of output 3, this means that the sensor is blocked or damaged and system should not operate. This flag is then communicated to the operator via the central monitor unit.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method for producing a total seed count value in response to movement of seeds in a duct comprising:

providing a duct and causing a series of seeds to pass through the duct;

mounting a light source at one side of the duct;

mounting a light sensor at an opposed side of the duct so as to receive light from the source;

causing the sensor to produce an output signal proportional to light intensity falling on the sensor, such that the passage of the series of seeds between the source and the sensor generating a series of momentary reductions in the light intensity from a steady state intensity, generates series of pulses in the output signal from a steady state output signal;

and providing an electronic circuit receiving the series of pulses in the output signal and generating said total seed count value in response to the series of pulses, the electronic circuit operating by:

generating for each pulse a pulse time period value representative of a time period of the pulse;

generating an average pulse time period from a plurality of the pulses;

comparing the pulse time period of each pulse with the average pulse time period;

generating a value, selected from zero, one and and at least one value greater than one, representative of a pulse count value for each pulse in dependence upon the comparison between the pulse time period of said pulse and the average pulse time period;

and adding said pulse count values of the series of the pulses to generate said total seed count value.

2. The method according to claim 1 including generating said pulses so as to have a time period defined between a leading edge and a trailing edge of the pulse which is representative of a time period of the output signal.

3. The method according to claim 1 wherein said pulse count value is generated in response to the ratio of the pulse time period and the average time period.

4. The method according to claim 1 wherein the average value is calculated using only those pulses for which a pulse count value of one seed is generated.

5. A method for producing a total seed count value in response to movement of seeds in a duct comprising:

providing a duct and causing a series of seeds to pass through the duct;

mounting a light source at one side of the duct;

mounting a light sensor at an opposed side of the duct so as to receive light from the source;

causing the sensor to produce an output signal proportional to light intensity falling on the sensor, such that the passage of the series of seeds between the source and the sensor generating a series of momentary reductions in the light intensity from a steady state intensity, generates series of pulses in the output signal from a steady state output signal;

and providing an electronic circuit receiving the series of pulses in the output signal and generating said total seed count value in response to the series of pulses, the electronic circuit operating by:

generating for each pulse an amplitude value representative of a maximum amplitude of the pulse;

generating an average amplitude value from a plurality of the pulses;

comparing the amplitude value of each pulse with the average amplitude value;

generating a value, selected from zero, one and at least one value greater than one, representative of a pulse count value for each pulse in dependence upon the comparison between the amplitude value of said pulse and the average amplitude value;

and adding said pulse count values of the series of the pulses to generate said total seed count value.

6. The method according to claim 5 wherein said pulse count value is generated in response to the ratio of the pulse amplitude and the average amplitude.

7. The method according to claim 5 wherein the average value is calculated using only those pulses for which a pulse count value of one seed is generated.

8. A method for producing a total seed count value in response to movement of seeds in a duct comprising:

providing a duct and causing a series of seeds to pass through the duct;

mounting a light source at one side of the duct;

mounting a light sensor at an opposed side of the duct so as to receive light from the source;

causing the sensor to produce an output signal proportional to light intensity falling on the sensor, such that the passage of the series of seeds between the source and the sensor generating a series of momentary reductions in the light intensity from a steady state intensity, generates series of pulses in the output signal from a steady state output signal;

and providing an electronic circuit receiving the series of pulses in the output signal and generating said total seed count value in response to the series of pulses, the electronic circuit operating by:

generating for each pulse a pulse time period value representative of a time period of the pulse;

generating an average pulse time period from a plurality of the pulses;

effecting a comparison of the pulse time period of each pulse with the average pulse time period;

generating for each pulse an amplitude value representative of a maximum amplitude of the pulse;

generating an average amplitude value from a plurality of the pulses;

effecting a comparison of the amplitude value of each pulse with the average amplitude value;

generating a value, selected from zero, one and and at least one value greater than one, representative of a pulse count value for each pulse in dependence upon both the comparison of the amplitude value of said pulse and the comparison of the pulse time period of said pulse;

and adding said pulse count values of the series of the pulses to generate said total seed count value.

9. The method according to claim 8 including generating said pulses so as to have a time period defined between a leading edge and a trailing edge of the pulse which is representative of a time period of the output signal.

10. The method according to claim 8 wherein said pulse count value is generated in response to the ratio of the pulse time period and the average time period and the ratio of the pulse amplitude and the average amplitude.

11. The method according to claim 8 wherein the average values are calculated using only those pulses for which a pulse count value of one seed is generated.

12. A method for producing a total seed count value in response to movement of seeds in a duct comprising:

providing a duct and causing a series of seeds to pass through the duct;

mounting a light source at one side of the duct;

mounting a light sensor at an opposed side of the duct so as to receive light from the source;

causing the sensor to produce an output signal proportional to light intensity falling on the sensor, such that the passage of the series of seeds between the source and the sensor, generating a series of momentary reductions in the light intensity from a steady state intensity, generates series of pulses in the output signal from a steady state output signal;

and providing an electronic circuit receiving the series of pulses in the output signal and generating said total seed count value in response to the series of pulses, the electronic circuit operating by:

calculating at least one average parameter from at least one parameter of a plurality of pulses;

effecting a comparison for each pulse of said at least one parameter of the pulse relative to said at least one average parameter and from the comparison generating a pulse count value for the pulse;

the pulse count values of the series of pulses including the value "1" representing a single seed and at least one further value representing multiple seeds;

and, for each of the pulses generating said at least one further value, forming a train of pulses including a pulse having said average parameter representing a single seed and at least one additional pulse equal in number to the number of seeds greater than the single seed, said at least one additional pulse having a parameter different from that of the average pulse such that said at least one additional pulse can be recognized from said average pulse.

13. The method according to claim 12 wherein said at least one additional pulse is shorter in time period than the average pulse.

14. A method for producing a total seed count value in response movement of seeds in a duct comprising:

providing a duct and causing a series of seeds to pass through the duct;

mounting a light source at one side of the duct;

mounting a light sensor at an opposed side of the duct so as to receive light from the source;

causing the sensor to produce an output signal proportional to light intensity falling on the sensor, such that the passage of the series of seeds between the source and the sensor, generating a series of momentary reductions in the light intensity from a steady state intensity, generates series of pulses in the output signal from a steady state output signal;

and providing an electronic circuit receiving the series of pulses in the output signal and generating said total seed count value in response to the series of pulses, the electronic circuit operating by:

calculating at least one average parameter from at least one parameter of a plurality of pulses;

effecting a comparison for each pulse of said at least one parameter of the pulse relative to said at least one average parameter and from the comparison generating a pulse count value for the pulse;

said pulse count values of the series of pulses including the value "1" representing a single seed and at least one further value representing multiple seeds;

adding said pulse count values of the series of the pulses to generate said total seed count value;

storing said total seed count value;

separately storing, for each of said at least one further values, a number representative of a total number of occurrences of said at least one further values;

and, when required, providing a read-out of said total number stored for each of said at least one further values.

15. A method for producing a total seed count value in response to movement of seeds in a duct comprising:

providing a duct and causing a series of seeds to pass through the duct;

mounting a light source at one side of the duct;

mounting a light sensor at an opposed side of the duct so as to receive light from the source;

causing the sensor to produce an output signal proportional to light intensity falling on the sensor, such that the passage of the series of seeds between the source and the sensor generating a series of momentary reductions in the light intensity from a steady state intensity, generates a series of pulses in the output signal from a steady state output signal;

and providing an electronic circuit receiving the series of pulses in the output signal and generating said total seed count value in response to the series of pulses, the electronic circuit operating by:

generating a second signal representative of the logarithm of the output signal;

separating the second signal into an AC component and a DC component using a decoupling capacitor;

amplifying the AC component through a first amplifier;

amplifying the DC component through a second amplifier, the second amplifier having a gain equal to that of the first amplifier, to generate a threshold value;

and comparing the AC component with the threshold value to generate a series of individual pulses for analysis.

16. The method according to claim 15 wherein the AC component is compared with the threshold by taking a fixed proportion of the AC component and subtracting the fixed proportion of the AC component from the threshold value.

17. The method according to claim 15 wherein the second amplifier is arranged such that the threshold is modified in dependence upon a distortion applied to the AC component by the first amplifier and the decoupling capacitor so as to cancel the distortion from the series of individual pulses for analysis.

18. The method according to claim 15 wherein the individual pulses for analysis are square pulses having a time period proportional to the series of output pulses and wherein the time periods of the pulses are analyzed to determine a pulse count value for each pulse.

19. The method according to claim 18 wherein the amplitude of the pulses from the first amplifier is analyzed in comparison with an average amplitude to generate said pulse count value for each pulse.

20. A method for producing a total seed count value in response to movement of seeds in a duct comprising:

providing a duct and causing a series of seeds to pass through the duct;

mounting a light source at one side of the duct;

mounting a light sensor at an opposed side of the duct so as to receive light from the source;

causing the sensor to produce an output signal proportional to light intensity falling on the sensor, such that the passage of the series of seeds between the source and the sensor generating a series of momentary reductions in the light intensity from a steady state intensity, generates series of pulses in the output signal from a steady state output signal;

providing an electronic circuit for receiving the series of pulses in the output signal and for generating said total seed count value in response thereto;

providing in the electronic circuit a control processor;

causing the control processor to provide a power-up protocol and at the power-up protocol to control the power supplied to the light source and to detect the output signal of the light sensor;

at the power-up protocol, causing the control processor to generate a pulsed reduction of a predetermined modulation value in the power supplied to the light source such that, in the event of proper operation of the light source and light sensor, a corresponding pulsed reduction in the output signal of the light sensor is generated;

and, in the event that no corresponding pulsed reduction is detected, causing the control processor to generate a fault warning signal to the operator that proper operation has not occurred.

21. The method according to claim 20 including:

causing the control processor to provide a first predetermined modulation value;

in the event that no corresponding pulsed reduction is detected, causing the control processor to provide a second predetermined modulation value which is increased relative to the first value;

and, in the event that no corresponding pulsed reduction is detected at the first modulation value but corresponding pulsed reduction is detected at the second higher modulation value, causing the control processor to generate a warning flag to the operator indicating that the light sensor is dirty but functioning;

and in the event that no corresponding pulsed reduction is detected at either modulation value, causing the control processor to generate a warning flag to the operator indicating that the light sensor is inoperative.

* * * * *